US012682151B2

(12) United States Patent
Malanga et al.

(10) Patent No.: US 12,682,151 B2
(45) Date of Patent: Jul. 14, 2026

(54) DATA EXTRACTION, VERIFICATION, AND FIELD POPULATION

(71) Applicant: Side, Inc., San Francisco, CA (US)

(72) Inventors: Amy K. Malanga, Denver, CO (US);
Jennifer N. Sekar, Hoboken, NJ (US);
David I. Drake, Portland, OR (US);
Nic C. Johnson, Sandy, UT (US);
Edward C. Wu, Scottsdale, AZ (US);
Stas A. Danishevskiy, Denver, CO (US)

(73) Assignee: Side, Inc., San Francisco, CA (US)

( * ) Notice: Subject to any disclaimer, the term of this patent is extended or adjusted under 35 U.S.C. 154(b) by 292 days.

(21) Appl. No.: 18/737,546

(22) Filed: Jun. 7, 2024

(65) Prior Publication Data

US 2024/0411982 A1 Dec. 12, 2024

Related U.S. Application Data

(60) Provisional application No. 63/507,080, filed on Jun. 8, 2023.

(51) Int. Cl.
*G06V 30/412* (2022.01)
*G06F 40/166* (2020.01)
(Continued)

(52) U.S. Cl.
CPC ......... *G06F 40/166* (2020.01); *G06Q 50/163* (2013.01); *G06V 30/10* (2022.01); *G06V 30/412* (2022.01); *G06V 30/42* (2022.01)

(58) Field of Classification Search
CPC .... G06F 40/166; G06V 30/10; G06V 30/412; G06V 30/42; G06Q 50/163
See application file for complete search history.

(56) References Cited

U.S. PATENT DOCUMENTS

| | | | | |
|---|---|---|---|---|
| 2020/0074169 | A1* | 3/2020 | Mukhopadhyay ...... | G06F 18/22 |
| 2023/0315981 | A1* | 10/2023 | Belhe .................... | G06F 40/166 |
| | | | | 704/9 |

OTHER PUBLICATIONS

Simin Wang et al., Machine/Deep Learning for Software Engineering: A Systematic Literature Review, May 9, 2022, IEEE Transactions on Software Engineering, vol. 49, No. 3, pp. 1188-1231 (Year: 2022).*

(Continued)

*Primary Examiner* — Tam T Tran
(74) *Attorney, Agent, or Firm* — Perkins Coie LLP

(57) ABSTRACT

A method can include receiving a document associated with a checklist item. A method can include identifying a template associated with the document. A method can include identifying an area of the document associated with a value of a key-value pair based at least in part on the template. A method can include extracting, using a first optical character recognition process, the value from the area. A method may cause display of the value. A method can include receiving a corrected value from the user. A method may include extracting, using a second optical character recognition process, full text of the document. A method may include determining a location of the corrected value in the document. A method may include updating the first optical character recognition process, wherein updating the first optical character recognition process causes the first optical character recognition to extract the value from the location.

20 Claims, 24 Drawing Sheets

(51) Int. Cl.
    *G06Q 50/163*     (2024.01)
    *G06V 30/10*     (2022.01)
    *G06V 30/42*     (2022.01)

(56)                 References Cited

OTHER PUBLICATIONS

Bertin Klein et al., Understanding Document Analysis and Understanding through Modeling, Jan. 1, 2003, International Conference on Document Analysis and Recognition, pp. 1-5 (Year: 2003).*

* cited by examiner

| Receive Property Selection 342 | → | Provide Action Items 344 | → | Receive New Document Upload 346 | → | Update Checklist 348 |

Receive Property Information from Agent 380

Receive TC Team Selection 382

Populate Coversheet Information 384

Generate Closing Timeline 386

Send Closing Timeline to Client 388

Schedule Documents for Sending 390

Review/Approve Coversheet 392

Receive Completed Documents 394

Review Completed Documents 396

Send Rejected Documents to Respective Parties 398

Client: Joe Buyer
Agent: Sam Agent

1234 Embarcadero, San Francisco, CA

| Action Items | Unassigned Documents | Audit Log |

Completed Electronically Signed Documents

Uploaded Documents
AD – Agency Disclosure (Buyer Only)       2024-05-27
RPA – Residential Purchase Agreement      2024-05-24

| Upload |

Checklist: | CAR – Single Family Home / Condo / Coop | ≫

| Document | Docs | Comments | Status | Actions |
|---|---|---|---|---|
| Preliminary Title Report | | | | ⋮ |
| Tax Record | | | Review | ⋮ |
| Agency Disclosure (Buyer Only) | | | | ⋮ |
| MLS – Full Agent Report | | | Review | ⋮ |
| Residential Purchase Agreement | | | | ⋮ |
| Seller Counter Offers | | | | ⋮ |
| Buyer Counter Offers | | | | ⋮ |
| Buyers Inspection Advisory | | | Accepted | ⋮ |
| Appraisal Addendum | | | | ⋮ |
| Discrimination Advisory | | | | ⋮ |
| Home Warranty | | | | ⋮ |
| Verification of Funds | | | | ⋮ |
| Loan Application | | | | ⋮ |

*FIG. 4A*

◆ 4321 Embarcadero, San Francisco, CA

Client: Joe Buyer
Agent: Sam Agent

| Action Items | Unassigned Documents | Audit Log |
|---|---|---|

▽ Filter

| Date/Time | User | Action | Description |
|---|---|---|---|
| 2023.04.12 14:22 | Compliance System | Accept | AgencyDisclosure.pdf Accepted |
| 2023.04.12 14:22 | Sam Agent | Assign | AgencyDisclosure.pdf assigned to AD - Agency Disclosure (Buyer Only) |
| 2023.04.08 08:45 | Sam Agent | Assign | 3R Report-1.pdf assigned to BIA – Buyers Inspection Advisory |
| 2023.04.06 15:32 | Compliance System | Reject | Submission blocked due to missing signature |
| 2023.04.06 12:32 | Sam Agent | Unassign | 3R Report-1.pdf unassigned from AD – Agency Disclosure (Buyer Only) |
| 2023.04.05.12:32 | Compliance System | Review | TitleReport.pdf routed for review |

*FIG. 4B*

1010 Receive document

1020 Identify document type

1030 Extract data from document

1040 Display data to user

1050 Receive indication of correct location from user

1060 Update extraction model

DATA EXTRACTION, VERIFICATION, AND FIELD POPULATION

PRIORITY AND RELATED APPLICATIONS

This application claims the benefit of priority to U.S. Provisional Application No. 63/507,080, filed Jun. 8, 2023, the contents of which are incorporated by reference in their entirety as if set forth fully herein. Any and all applications for which a foreign or domestic priority claim is identified in the Application Data Sheet as filed with the present application are hereby incorporated by reference under 37 CFR 1.57.

TECHNICAL FIELD

The present application is directed to systems and methods for extracting information from textual and non-textual data sources. Some embodiments are directed to extracting values associated with key-value pairs from non-textual data sources. Some embodiments are directed to validating received data to ensure compliance with completeness and/or correctness rules.

BACKGROUND

Over the years, the quantity of documentation involved in supporting real estate transactions (e.g., sales, purchases, leases, etc.) and financing of such transactions has grown. The required documents have become increasingly numerous and complex, and assuring compliance has become more difficult. Moreover, documentation requirements generally differ between communities, so agents and brokers must pay attention to differences in local regulations. They must also keep up with changes in the regulations for all relevant governing bodies for each transaction. Governing bodies may also be overlapping, and any transaction occurring within the jurisdiction of multiple governing bodies must comply with the regulations of all of those governing bodies. For example, there are often separate regulations at neighborhood, city, county, and state levels.

Ensuring compliance with all guidelines and regulations can be time-consuming and difficult. Failure to comply with regulations can potentially invalidate the real estate transaction and can expose real estate agents and brokers to litigation and possible liability for failed transactions. Therefore, there is a need for facilitating and/or at least partially automating the compliance review process in real estate transactions.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

In some embodiments, a compliance review system may facilitate or at least partially automate a compliance review process for auditing real estate transaction documents. In some embodiments, the system may provide an interface for transaction coordinators or other agents to communicate with compliance review teams or other auditors.

In some embodiments, the compliance review system may provide transaction coordinators with a checklist of compliance requirements of one or more applicable jurisdictions and lists of documents needed to satisfy those compliance requirements. In some embodiments, the system may receive, from the transaction coordinators, documents organized by the compliance requirements on the checklist.

In some embodiments, the compliance review system may approve one or more documents based on various factors such as a risk tier list that ranks the inherent risk level of different types of documents, and/or transaction coordinator reliability score. In some embodiments, the system may leave one or more documents unapproved for manual approval by the auditors.

In some embodiments, the compliance review system may transmit and/or display the documents received from the transaction coordinators to the auditors, organized by the compliance requirements on the checklist. In some embodiments, the system may enable the auditors to approve or reject each document as satisfying a particular compliance requirement. In some embodiments, the system may coordinate workflow between the transaction coordinators and the auditors in a continuous manner until the compliance review process is completed.

In some embodiments, the techniques described herein relate to a computer-implemented method for document ingestion including: receiving a document associated with a checklist item of a checklist; determining a document type of the document; identifying a template associated with the document based at least in part on the document type; identifying an area of the document associated with a value of a key-value pair based at least in part on the template; extracting, using a first optical character recognition process, the value from the area, wherein the first optical character recognition process is configured to extract the value from the area associated with the value; causing display, to a user, of the value; receiving a corrected value from the user; extracting, using a second optical character recognition process, full text of the document; determining, based at least in part on the full text of the document, a location of the corrected value in the document; and updating, based on the location, the first optical character recognition process, wherein updating the first optical character recognition process causes the first optical character recognition process to extract the value from the location.

In some embodiments, the techniques described herein relate to a computer-implemented method, further including: identifying a signature block in the document; identifying a signature in the signature block; determining a compliance rule associated with the signature block; applying the compliance rule to the signature in the signature block; and determining, based on applying the compliance rule, that the signature in the signature block complies with the compliance rule.

In some embodiments, the techniques described herein relate to a computer-implemented method, wherein determining that the signature complies with compliance rule includes: generating a vector representation of the signature;

3 computing a cosine similarity of the vector representation of the signature and a vector representation of another signature associated with a same signer; and determining that the cosine similarity is above a threshold value, wherein the cosine similarity includes a value from zero to one.

In some embodiments, the techniques described herein relate to a computer-implemented method, wherein determining the document type includes: generating a vector representation of the document; accessing a plurality of template vector representations; computing at least one cosine similarity of the vector representation of the document and at least one of the plurality of template vector representations, wherein comparing including computing a cosine similarity; and determining, based on the cosine similarity, a matching template, wherein the matching template has is associated with the document type.

In some embodiments, the techniques described herein relate to a computer-implemented method, further including: receiving an indication from the user that the document is ready for review; storing the document in a data store; storing the value of the key-value pair in the data store, wherein the value is associated with the document; and providing an auditor notification, wherein the auditor notification indicates that the document is ready for review.

In some embodiments, the techniques described herein relate to a computer-implemented method, further including: receiving a rejection indication; identifying a rejection reason; and updating the checklist item, wherein updating the checklist item includes providing an indication that the document was rejected.

In some embodiments, the techniques described herein relate to a computer-implemented method, further including: determining, based at least in part on the document type, a compliance rule associated with the document; applying the compliance rule, wherein the applying the compliance rule including checking for at least one of: correctness of the document or completeness of the document; determining, based at least in part on applying the compliance rule, that the document complies with the compliance rule; and accepting the document, wherein accepting the document includes updated the checklist item to indicate that the checklist item is complete.

In some embodiments, the techniques described herein relate to a computer-implemented method, further including: determining, based at least in part on the document type, a risk level associated with the document; determining, based at least in part on the risk level, a review level for the document; and routing the document for review based on the review level, wherein routing the document for review includes at least one of: automatically accepting the document, conducting an automatic system review of the document, or routing the document for manual review.

In some embodiments, the techniques described herein relate to a computer-implemented method, wherein routing the document for review includes automatically accepting the document when the risk level indicates that the document is an inherently low risk document.

In some embodiments, the techniques described herein relate to a computer-implemented method, further including: determining, based at least in part on the value, an update to the checklist; updating the checklist based on the determined update, wherein updating the checklist includes one or more of: adding a checklist item, removing a checklist item, changing a checklist item from optional to required, or change a checklist item from required to optional.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

Figure 1:
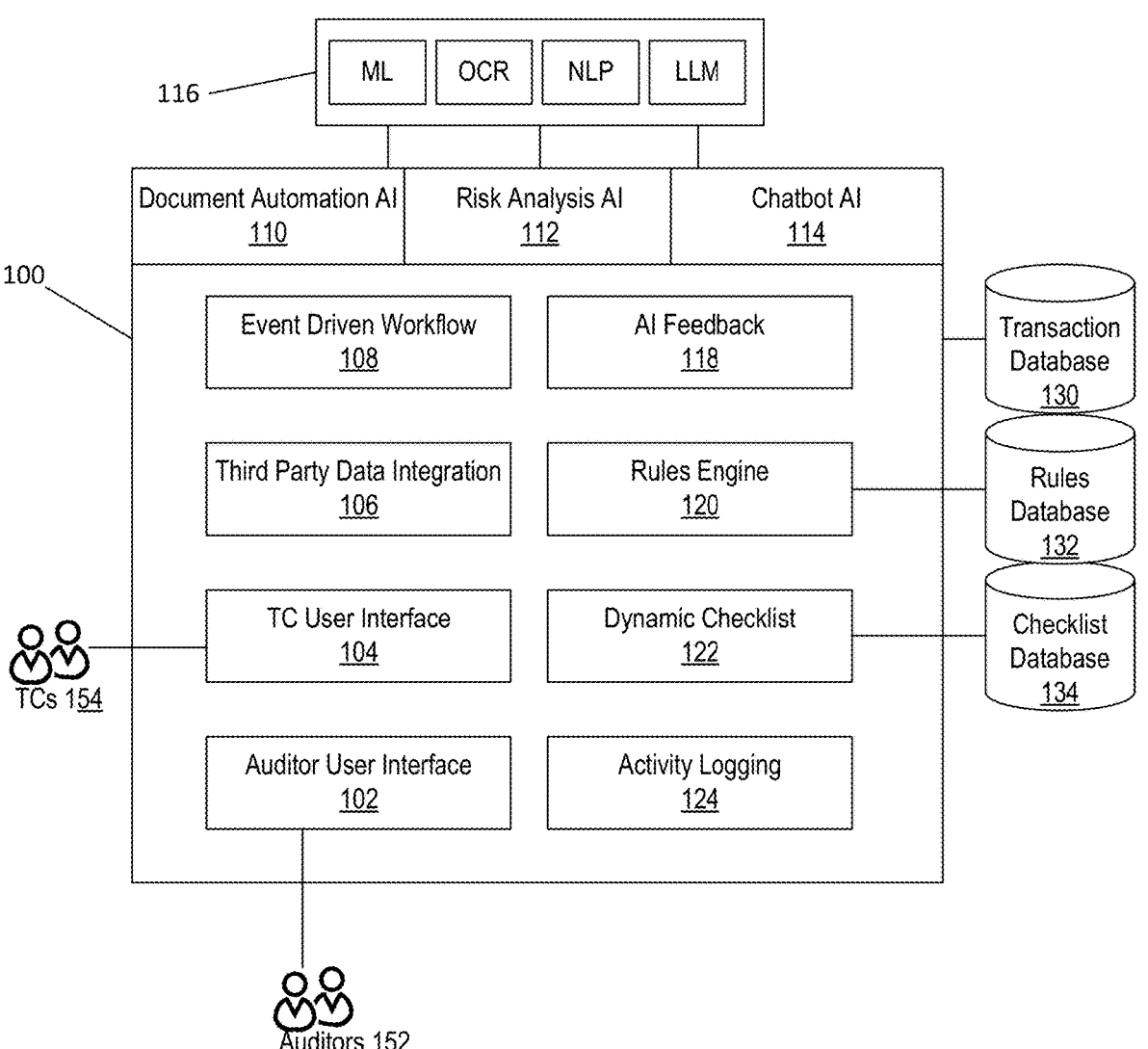

FIG. 1 shows a system diagram of a compliance review system 100 in accordance with an embodiment of the present technology.

Figure 2A:
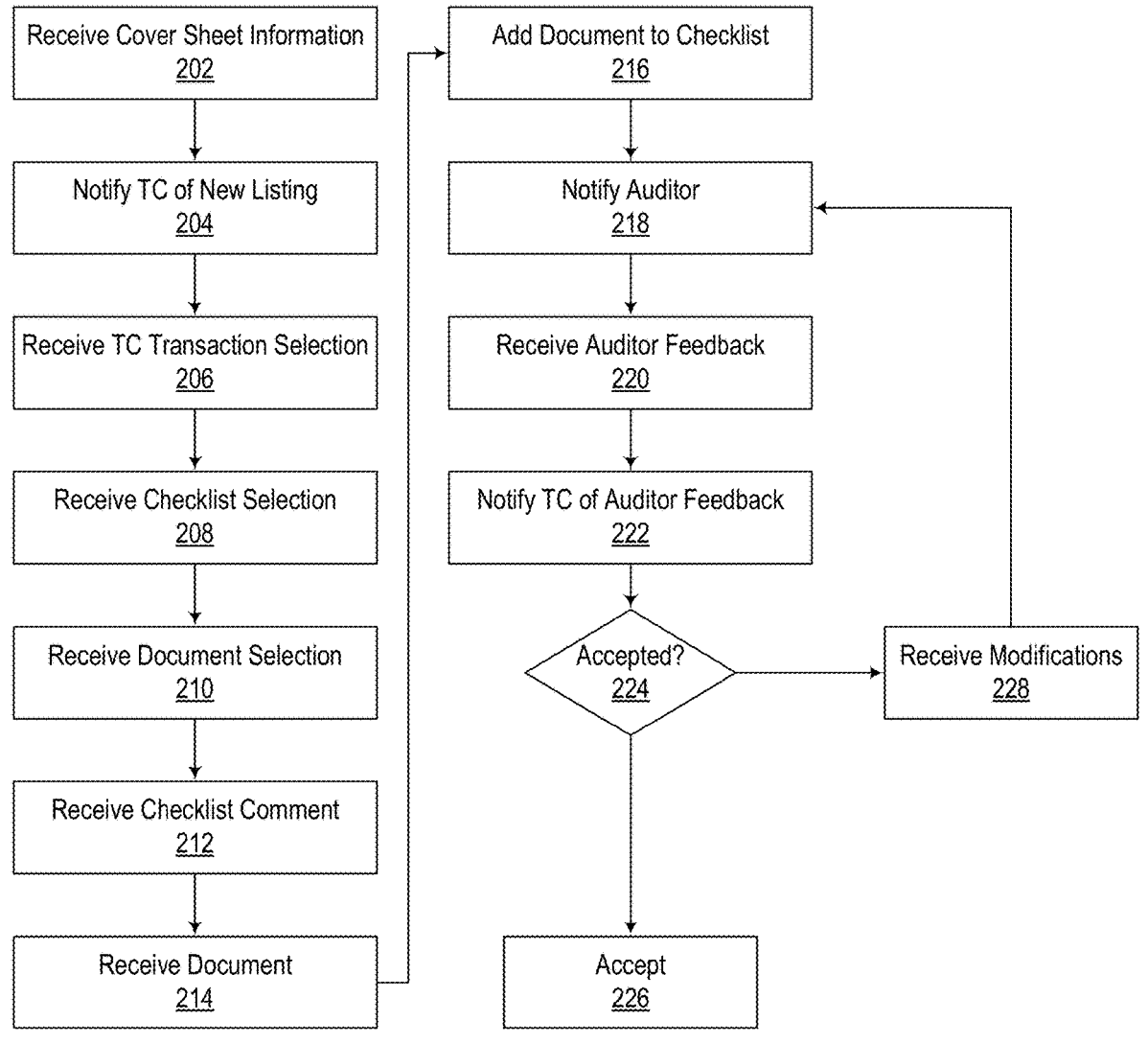
Figure 2B:
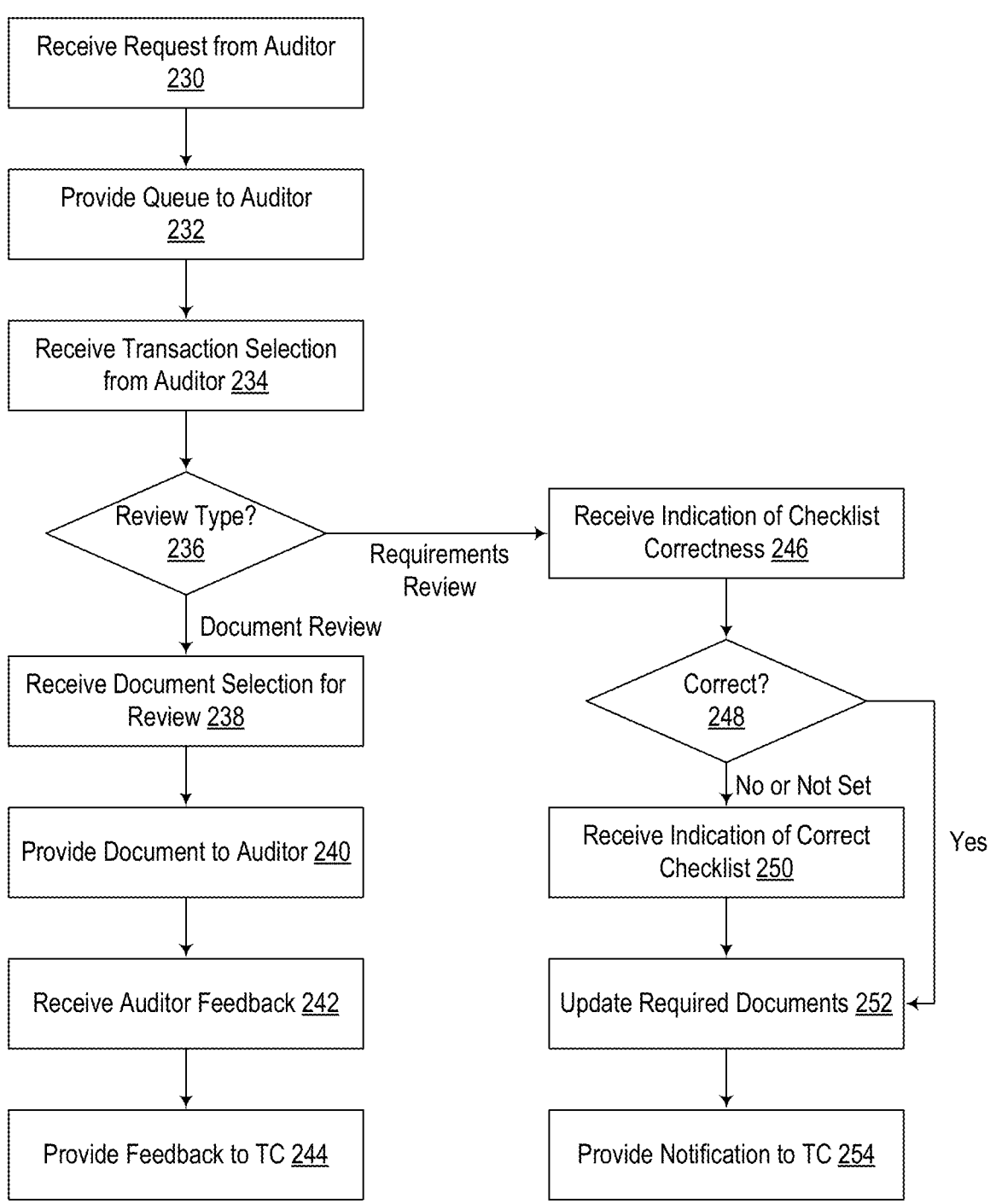

FIGS. 2A and 2B are flowcharts that illustrate transaction coordinator and auditor workflows managed by a compliance review system according to some embodiments.

FIGS. 3A-3I show flowcharts illustrating example workflows managed by a compliance review system according to some embodiments.

FIGS. 4A and 4B show transaction coordinator-side user interfaces of a compliance review system in accordance with an embodiment of the present technology.

Figure 5:
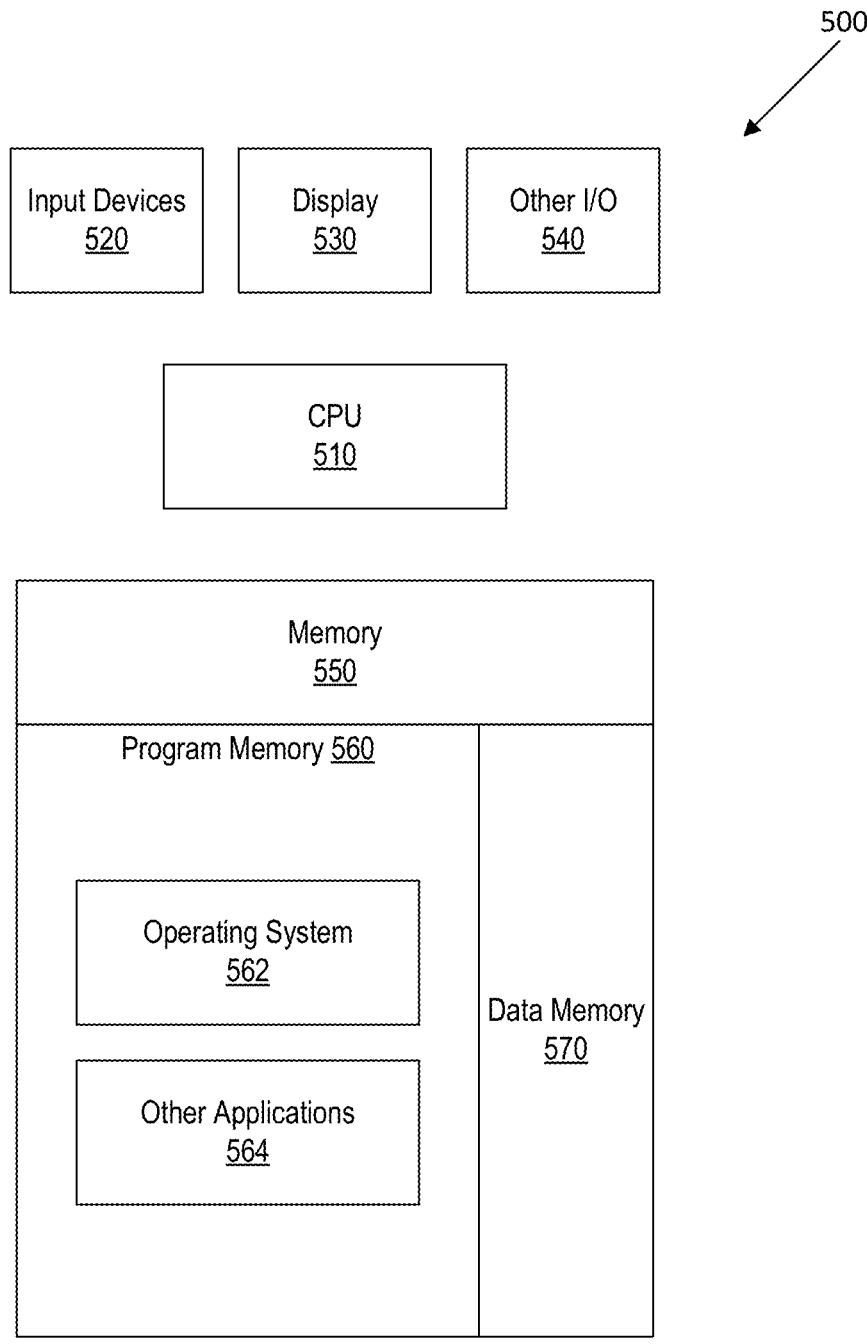

FIG. 5 is a block diagram illustrating an overview of devices on which some implementations of the compliance review system can operate.

Figure 6:
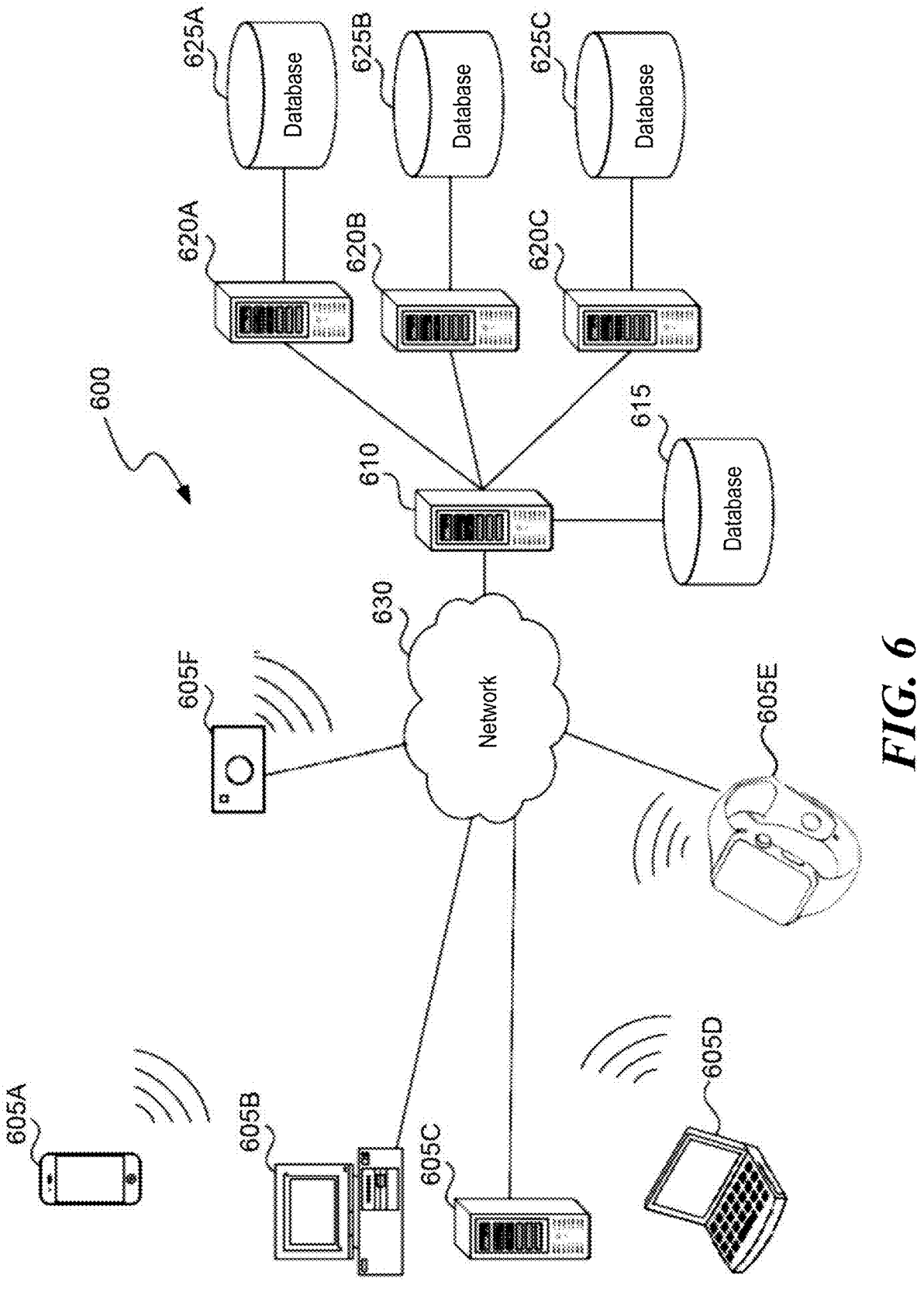

FIG. 6 is a block diagram illustrating an overview of an environment 600 in which some implementations of the compliance review system can operate.

Figure 7:
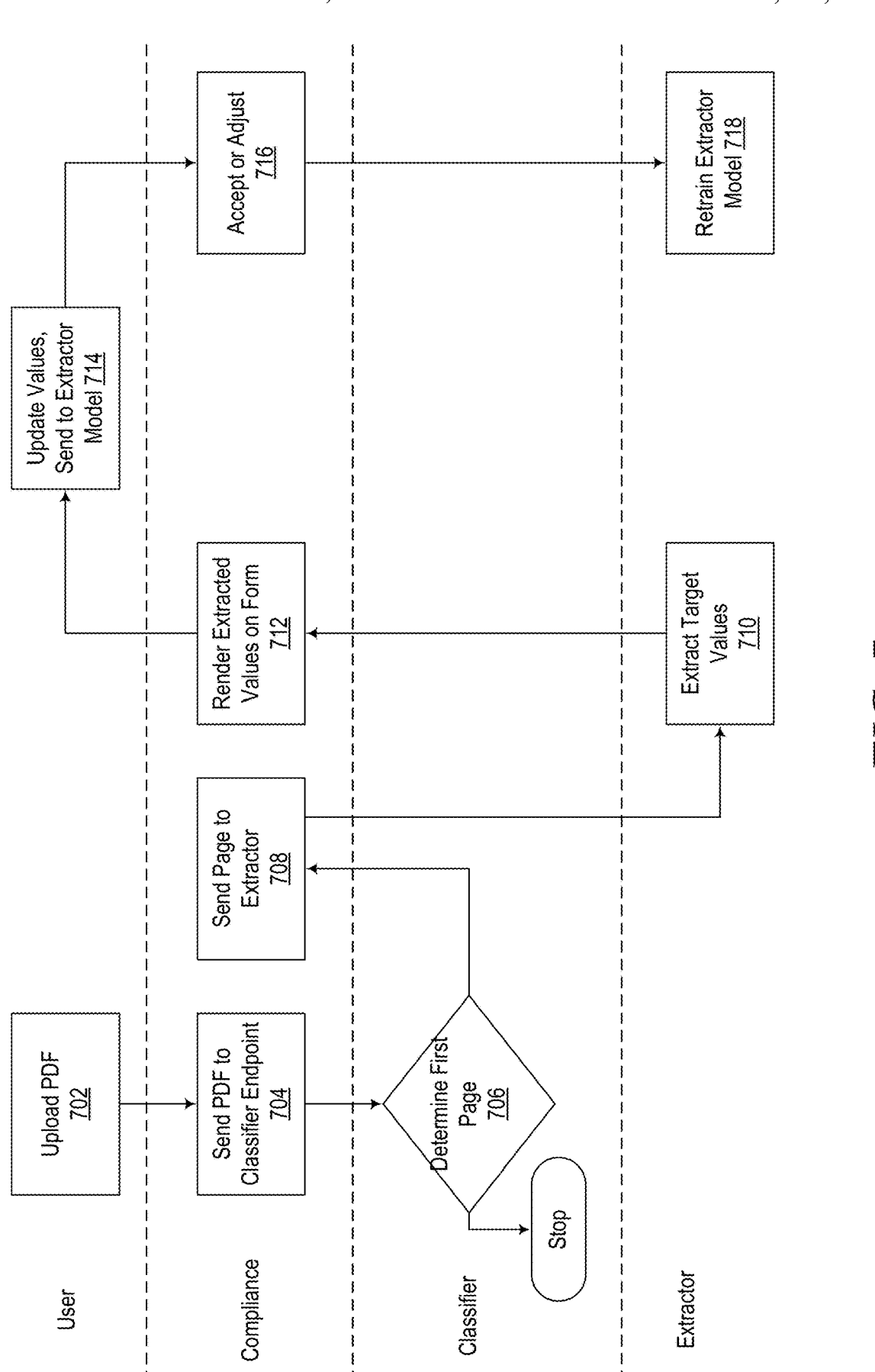

FIG. 7 is a flowchart that illustrates a process for extracting information from a document according to some embodiments.

Figure 8:
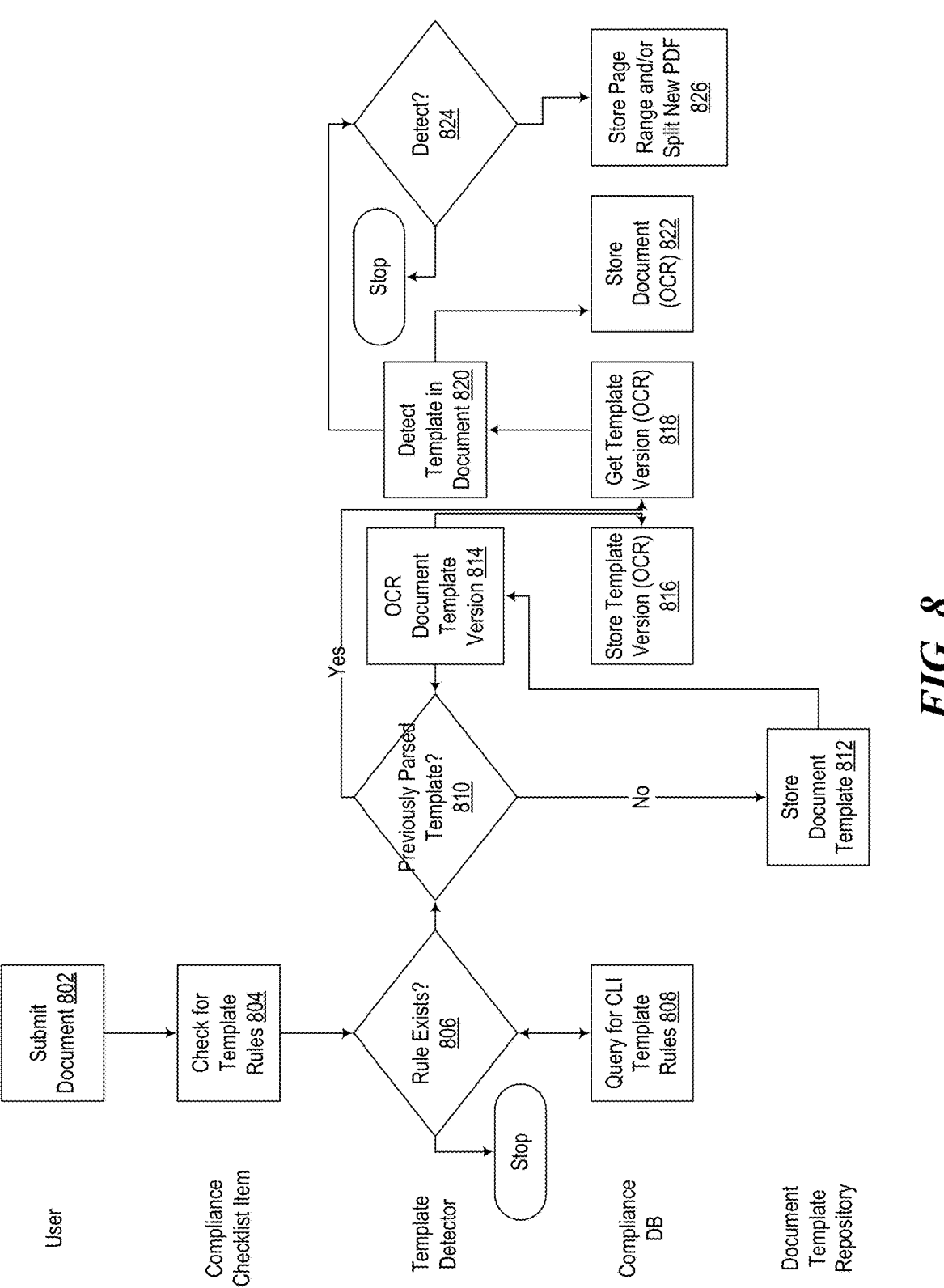

FIG. 8 is a flowchart that illustrates an example extraction process according to some embodiments.

Figure 9:
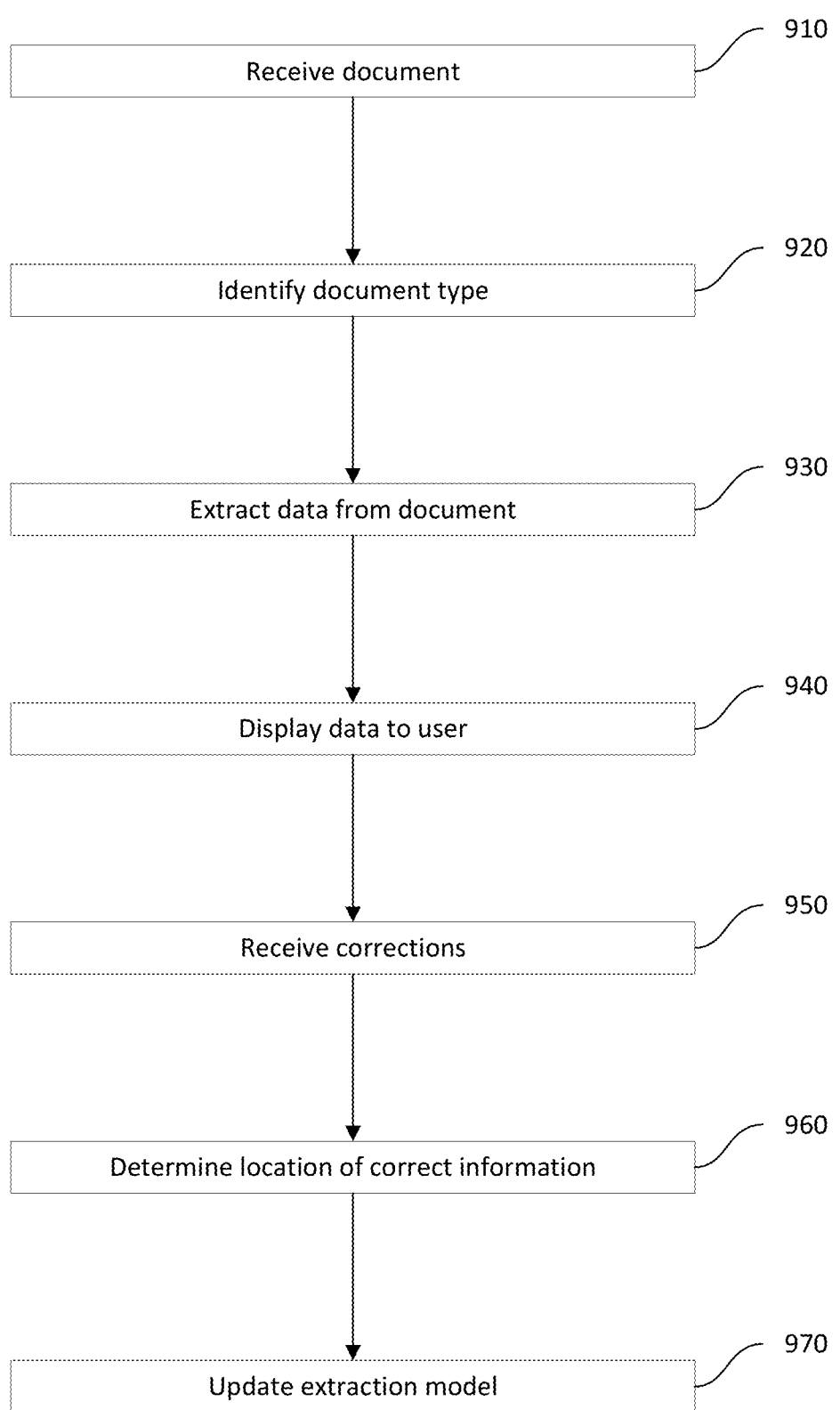

FIG. 9 illustrates an example process for updating an extraction model according to some embodiments.

Figure 10:
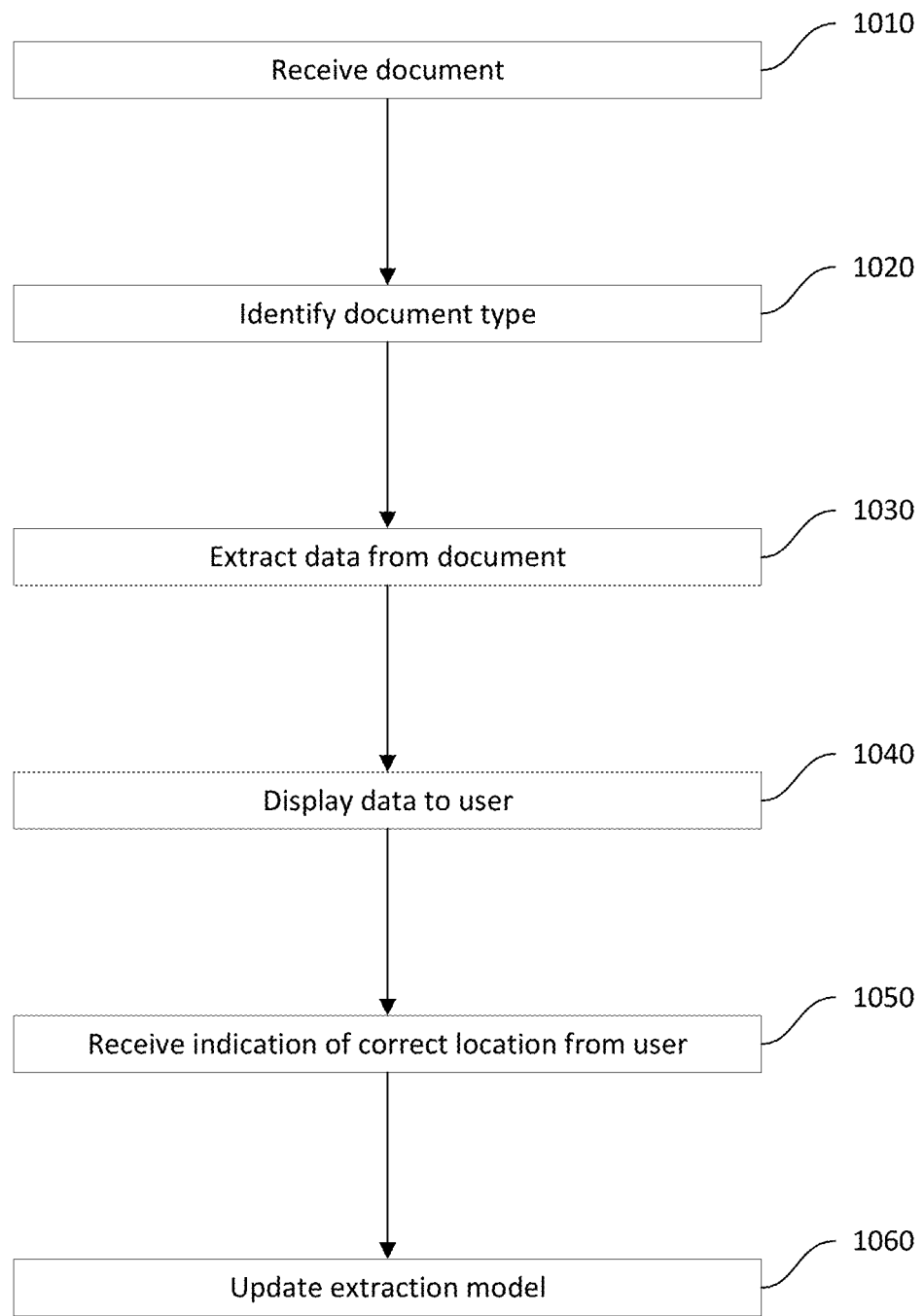

FIG. 10 illustrates another example process for updating an extraction model according to some embodiments.

Figure 11:
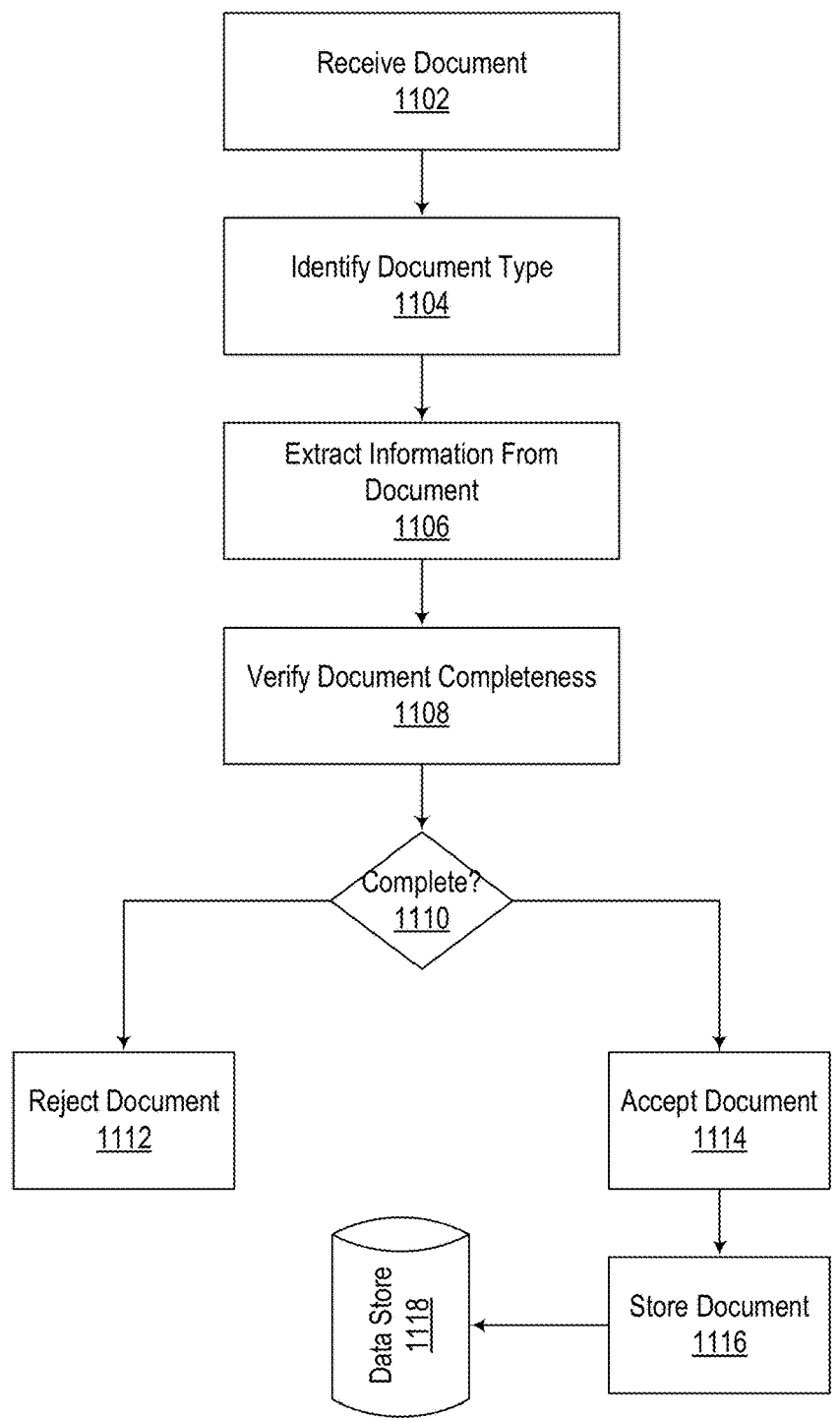

FIG. 11 is a flowchart that illustrates an example process for determining document completeness according to some embodiments.

Figure 12:
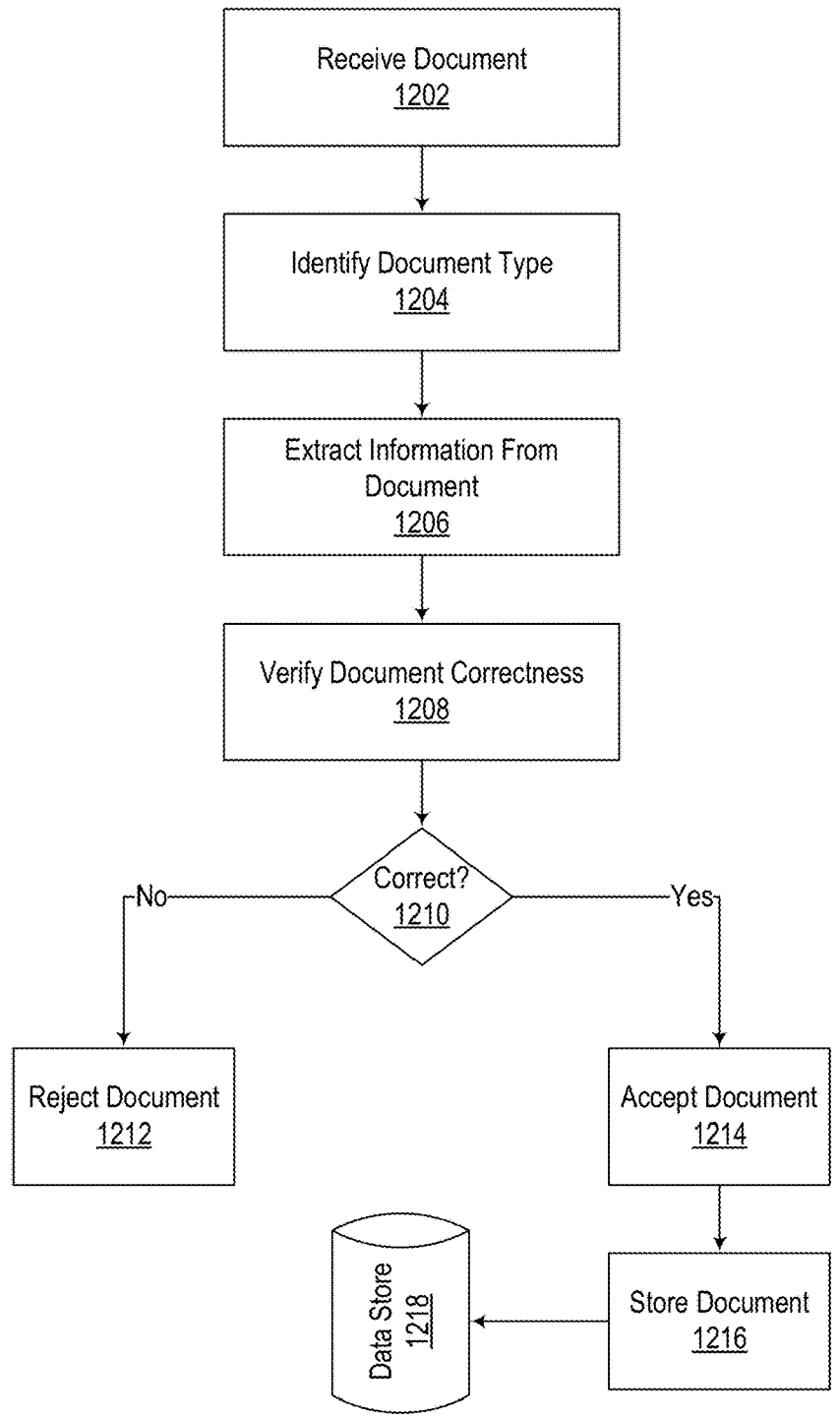

FIG. 12 is a flowchart that illustrates an example process for determining document completeness according to some embodiments.

Figure 13:
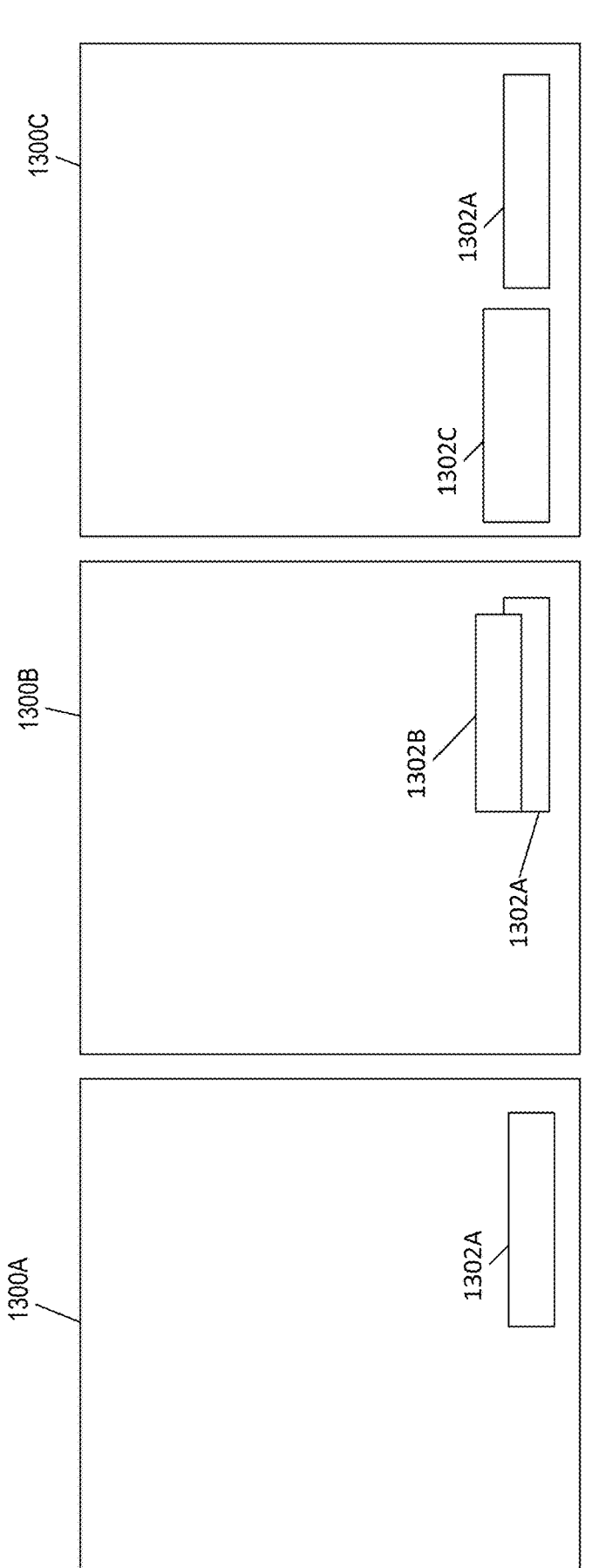

FIG. 13 is a diagram that illustrates example documents and blocks according to some embodiments.

Figure 14:
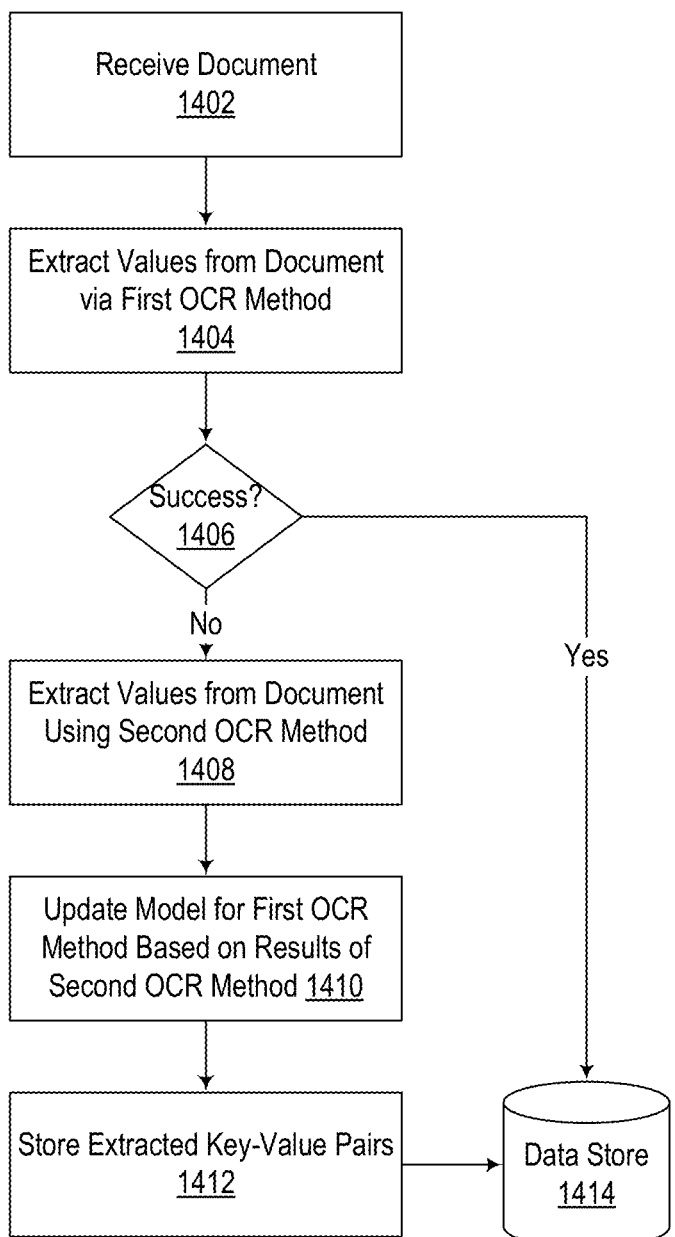

FIG. 14 is a flowchart that illustrates an example process for updating a model for a first OCR method according to some embodiments.

Figure 15:
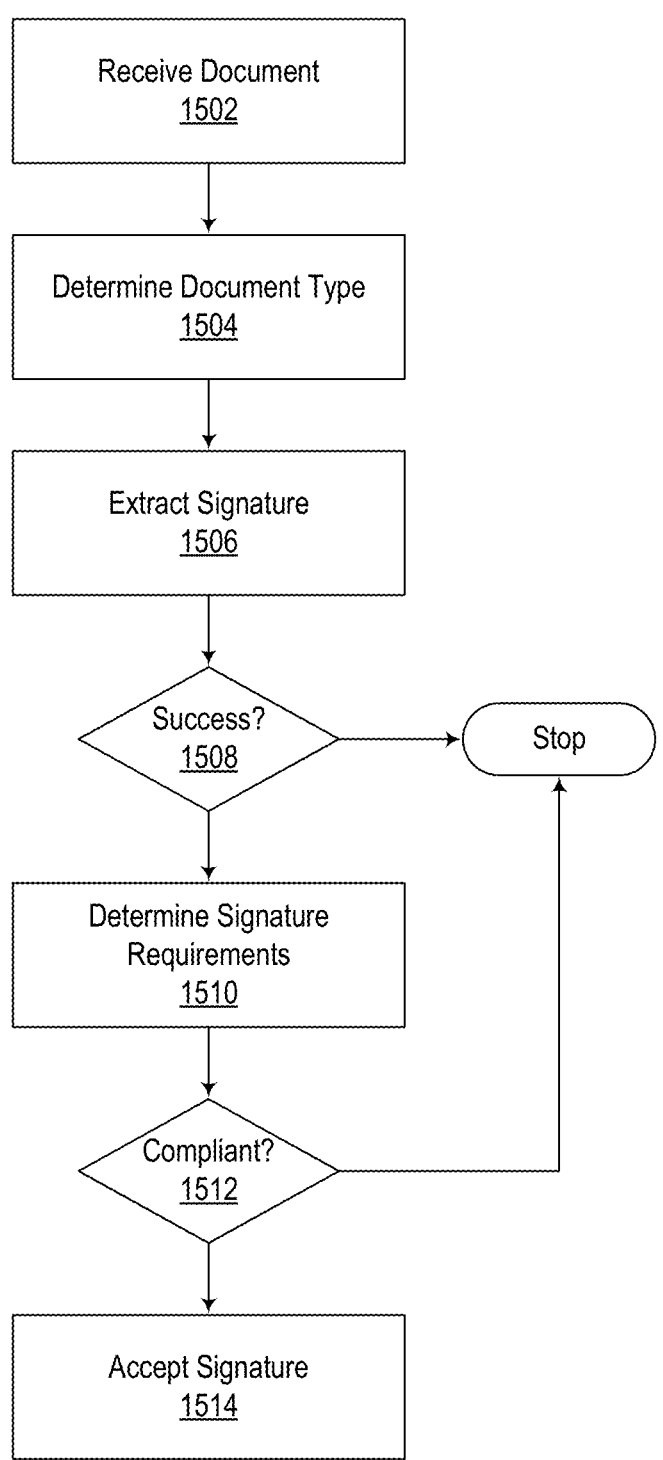

FIG. 15 is a flowchart that illustrates an example signature verification process according to some embodiments.

Figure 16:
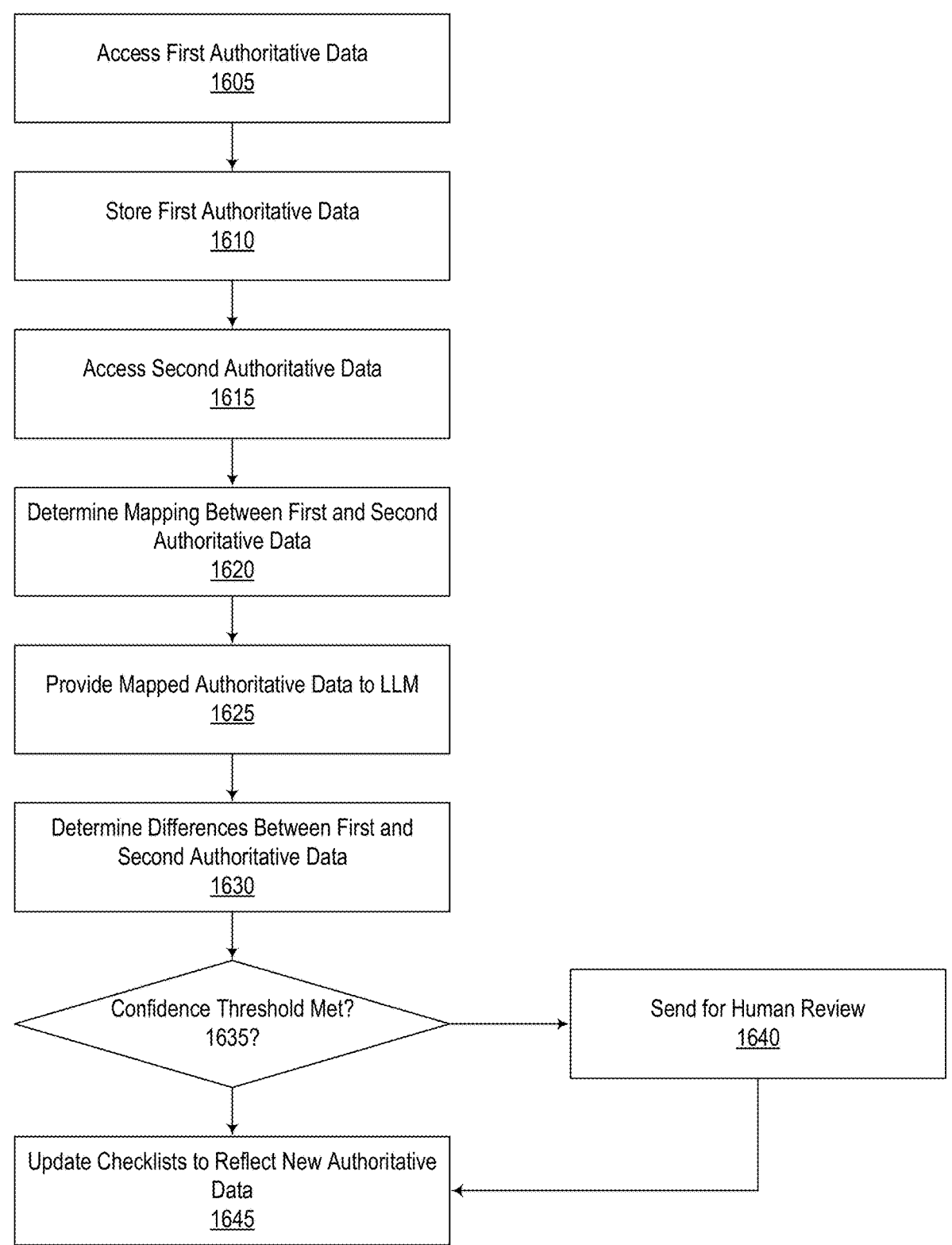

FIG. 16 is a flowchart that illustrates an example process for determining changes to laws, regulations, forms, and so forth, according to some embodiments.

Figure 17:
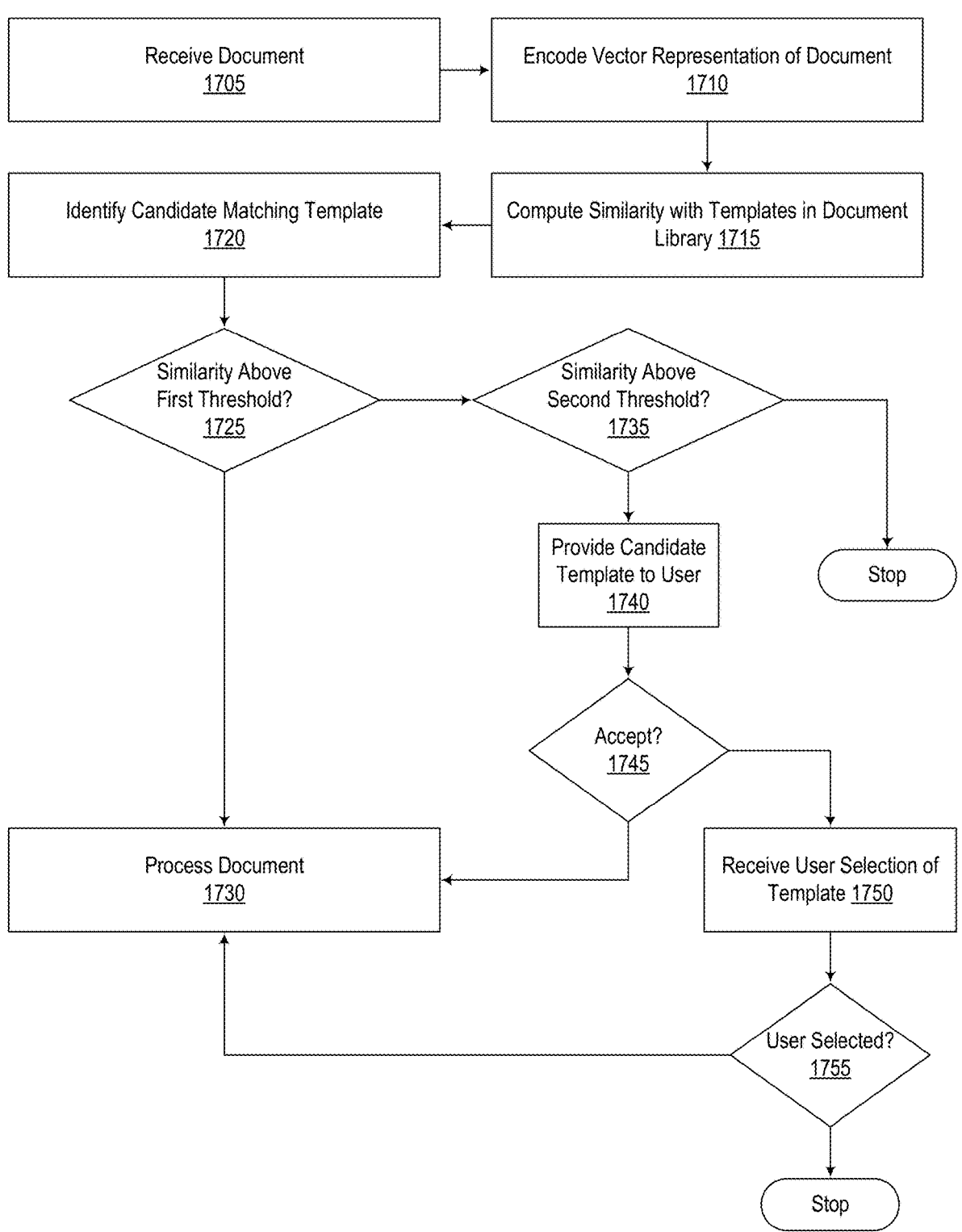

FIG. 17 is a flowchart that illustrates a process for identifying a document type according to some embodiments.

DETAILED DESCRIPTION

Although several embodiments, examples, and illustrations are disclosed below, it will be understood by those of ordinary skill in the art that the inventions described herein extend beyond the specifically disclosed embodiments, examples, and illustrations, and include other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Optical character recognition (OCR) is commonly used to extract information from documents. OCR can be used to identify and extract text from documents, enabling the information in documents to be more easily stored, used, manipulated, etc. OCR can be performed in various ways. For example, when scanning an essay, contract, etc., a system can process the entire document and generate an output of the text contained within the document. Such an approach can work well when there is a need for all of the content in the document, when the document does not have a known layout where relevant information is expected, etc. However, full document scanning can consume significant computing resources and can take significant time. Often, only parts of documents are needed. For example, if a document is a form that contains information in various fields, there may only be a need for information contained in the fields, rather than for the entire document. In such cases, processing the entire document not only consumes more computing resources but can also make it harder to identify the relevant information, as the relevant information may be contained within a larger body of text.

Some existing approaches can be configured to extract information from specific areas within a document. For example, an Office Action Summary form may contain the application number, art unit, examiner name, etc., in specific places within the page. In some embodiments, a system can be configured to extract information from specific locations within a document, which can be significantly faster than processing the entire document.

In some cases, forms can be templated so that when they are processed, only text in specific areas is processed. For example, a user may draw a rectangle on a form that indicates where particular information can be found. For example, the user may draw a box in the upper right corner of an Office Action Summary indicating where the name of the Applicant can be found.

Such manual approaches can work well when there is a limited number of forms and forms tend to change infrequently. However, such an approach can become untenable when there are many different forms or when forms tend to change significantly over time.

Additional complications can arise when a single file contains multiple documents. For example, there can be a need to split the file into multiple documents, to identify specific documents within a file, and so forth. This can be common when, for example, there are several forms that require signatures, and all the forms are scanned at the same time into a single document.

Accordingly, there is a need for improved approaches for OCR and/or document splitting functionality in scenarios in which forms frequently change or there are many different kinds of forms, when multiple documents are combined into a single file, and so forth. In some embodiments, the approaches herein can significantly improve OCR processes, for example by automatically adapting partial OCR to be able to extract only relevant information from new or revised forms.

The approaches herein can aid in splitting documents, for example by more reliably extracting titles or other identifiers from forms and other documents, which can help identify where a larger file should be split as well as to categorize individual forms or documents that are contained within a larger file.

Real estate purchases and sales are the largest financial transactions and investments for many people, especially with the increasing cost of real estate. Due to the cost and time required to complete a real estate transaction, many individuals are not often involved in such transactions and may not be familiar with regulations governing the transactions and issues that can arise. Additionally, real estate transactions are complex and involve many details and issues. Accordingly, many purchasers and buyers choose to hire a knowledgeable advocate to assist with completing the transaction, including a real estate agent or broker. Real estate agents and brokers can provide a party to such transactions with useful information, including options and risks regarding the transaction. Further, agents and brokers have legal and financial responsibilities to ensure that a transaction is successfully completed and that the transaction complies with all applicable guidelines and regulations. As used herein, the term transaction is not necessarily limited to buying and selling real estate. Transactions can also include leasing, referral agreements, and/or the like.

Currently, most real estate transactions are performed manually, requiring an individual, such as an agent or broker, to identify, collect, and populate documents required to complete a real estate transaction. The agent or broker must also ensure that the documents contain any updates and are correctly populated. Such manual tasks can be time-consuming due to the number of documents required and the different requirements established by differing regulations between governing bodies. Additionally, the manual process for real estate transactions is prone to several sources of compliance errors as real estate agents and brokers prepare document packages for real estate transactions. Such errors and other failures to comply with the required regulations can invalidate a transaction and can expose agents and brokers to costly litigation, as well as stain the reputation of the agent or broker. Challenges associated with the manual process of real estate transactions make manual compliance difficult and error-prone, as large numbers of documents, different regulations and rules for different locations, and new information that becomes available during the transaction must be identified and included in the documents.

In some embodiments, as described herein, a system for compliance review may provide an interface between (1) transaction coordinators or other agents ("TC") and (2) compliance review teams or other auditors ("Auditors"). In some embodiments, the system provides a predetermined checklist listing the compliance requirements of one or more applicable jurisdictions. The workflows of the TCs and the Auditors can include listings, offers to buy, referrals, leases, etc., related to real estate or other property.

In some embodiments, the system includes a receiving end for managing the workflow of the TCs. The receiving end can receive one or more documents for satisfying one or more compliance requirements. In some embodiments, the system can include a UI, an API, a database, cloud functions, etc. for receiving the documents from the TCs.

In some embodiments, the system includes a reviewing end for managing the workflow of the Auditors. The reviewing end can display or otherwise communicate the documents received from the TCs to the Auditors via a UI, an API, a database, cloud functions, etc. The Auditors can then view the documents and either approve or reject each document as satisfying a particular compliance requirement.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

Compliance Review System Overview

FIG. 1 shows a system diagram of a compliance review system 100 in accordance with an embodiment of the present technology. In some embodiments, the compliance review system 100 may provide brokerage services or compliance review/auditing services in the form of Software as a Service (Saas).

In some embodiments, the compliance review system 100 may have a TC User Interface module 104 that provides user interfaces for transaction coordinators 154 ("TCs") or other agents to interact with the compliance review system 100, such as through their user device. The compliance review system 100 may also have an Auditor User Interface module 102 that provides user interfaces for auditors 152 or compliance review teams to interact with the compliance review system 100, such as through their user device.

These user interfaces may facilitate interaction and communication between TCs 154 and auditors 152, especially with respect to a particular transaction. These user interfaces may also provide various tools, shortcuts, and efficiencies to improve the experiences of the Auditors 152 and the TCs 154. For example, the Auditors 152 may be able to access a tabular view to see all of their inflight transaction audits and their statuses. A specific audit may be selected to see a more detailed view that allows further actions to be performed. Examples of such functions include enabling the auditor to create a custom checklist item for a specific audit, sending notes/reasons to the TCs 154 about action items and things that need to be addressed in the audit, setting statuses and stages for a particular audit to facilitate workflows within their department, and so forth. These various views of the audits may include filtering and sorting, which can facilitate more efficient workflows. The TCs 154 may be able to access a list view to see all of their in-flight transaction audits and their statuses. A specific audit may be selected to see a more detailed view that allows further actions to be performed. In some cases, notes, emails, or alerts may be sent to the TCs 154 to inform them of issues that need to be addressed in their audits. In some embodiments, the system 100 may be integrated with customer service chat, and the TCs 154 or auditors 152 may be able to chat in real-time with a customer service representative within these user interfaces.

In some embodiments, the compliance review system 100 may receive one or more documents from the TCs 154 or the auditors 152 through one or more user interfaces provided by the TC User Interface module 104 and/or the Auditor User Interface module 102, through APIs, through databases, and/or through cloud storage, in order to satisfy one or more compliance requirements. For example, there may be an upload function for the TCs 154 to send documents from their local hard drive to the compliance review system 100 or an attachment function that allows TCs 154 to associate uploaded documents with specific checklist items. In some embodiments, these documents can be stored in the Transaction Database 130 along with any other relevant information about that transaction. However, it should be noted that these documents do not necessarily need to be furnished by the TCs 154 or the auditors 152. For instance, in some embodiments, the system 100 can provide the documents (e.g., templates) to the TCs 154 to fill out instead of requiring that the documents be prepared and uploaded by the TCs 154.

In some embodiments, the compliance review system 100 may allow one or more documents to be displayed to and reviewed by the TCs 154 or the auditors 152 through user interfaces provided by the TC User Interface module 104 and/or the Auditor User Interface module 102. The TCs 154 and/or auditors 152 may be able to preview the documents they had previously uploaded through these user interfaces. For example, the user interfaces provided to the auditors 152 may include user interfaces for displaying documents or other communication received from the TCs 154. The Auditors 152 can view the documents and either approve or reject each document as satisfying a particular compliance requirement. In some embodiments, the system 100 may provide a predetermined checklist listing the compliance requirements of one or more applicable jurisdictions to the auditors 152 or the TCs 154 for review.

In some embodiments, the compliance review system 100 may include a Third Party Data Integration module 106 which may serve to integrate the system with third-party data services or data suppliers. For example, the compliance review system 100 may utilize module 106 to request or retrieve specific documents directly from a third-party data service, such as via an API. As a more specific example of this, the system may be configured to allow TCs to order a natural hazard disclosure ("NHD") report or tenant flood report from a third-party data service, such as ClearNHD, via a user interface provided by the TC User Interface module 104. The compliance review system 100 may be integrated with any suitable data vendor, such as a home warranty vendor or title insurance provider for example. As a more specific example of this, the system may be integrated to allow TCs to order a home warranty policy from a third-party data vendor or warranty provider, such as Super Home Warranty, via a user interface provided by the TC User Interface module 104.

In some embodiments, the compliance review system 100 may include an Event Driven Workflow module 108 that helps manage the various components of the compliance review system 100 and their interactions with one another, handles the dynamic nature of the compliance workflow and its various steps, and enables additional administration and supervision of a particular transaction audit.

For instance, the Event Driven Workflow module 108 may manage the workflow of the TCs 154 and the auditors 152, thereby dictating the current stages of the workflow and which user interfaces are permitted to be presented to the TCs 154 or the auditors 152. The Event Driven Workflow module 108 may also apply filters and restrictions on the workflow, such as to prevent incomplete data from being synced to downstream systems and components. As an example of this, there could be prerequisite data checks that prevent TCs 154 from starting an Audit before key data points are present. As another example, there can be a function that restricts a TC 154 from adding further documents until either a Tax or Prelim Report document has been attached, resulting in increased auditor efficiency because this specific type of document is used to verify property ownership and validate all other documents in the audit. In some embodiments, the Event Driven Workflow module 108 may play a role in alerts and notifications, such as sending system-generated emails to TCs 154 to alert them of upcoming listing expirations and missing checklist requirements.

As another example of the role of Event Driven Workflow module 108, in some embodiments, it may enable an administrative user to migrate in-flight transactions into the system for newly onboarding partners and agents or to assign multiple TCs 154 and/or auditors 152 to an audit for visibility across a team.

In some embodiments, the system 100 may automatically forward any communication and/or attachments detected to the TCs 154 and Auditors 152, such as by auto-populating a transactional email address as a recipient to all communications made on the system 100. In some embodiments, the system 100 provides additional filters to accommodate a Closing Email program to increase retention of partners' clientele. In some embodiments, these functions may be handled by the Event Driven Workflow module 108.

In some embodiments, depending on the stages of the workflow, the Event Driven Workflow module 108 may invoke one or more corresponding components of the system 100 as needed by the workflow. For example, in some embodiments, the compliance review system 100 may include various AI components such as a Document Automation AI 110, a Risk Analysis AI 112, and/or a Chatbot AI 114. These AI components may utilize one or more AI or data processing techniques 116, such as machine learning (ML), large language models (LLMs), optical character recognition (OCR), natural language processing (NLP), and so forth. These AI or data processing techniques may be integrated into one or more particular applications associated with the system. For example, NLP and/or an LLM can be used to summarize a freeform document such as an inspection report. These AI components or models may be trained on, or fine-tuned based on, data specific to real estate transactions. In some embodiments, AI components can utilize retrieval augmented generation (RAG) techniques to improve the performance, accuracy, etc., of AI components. In some embodiments, these AI components may be used together or integrated.

In some embodiments, the Event Driven Workflow module 108 may invoke a particular AI component based on the stage of the workflow and corresponding need. For instance, as TCs 154 upload documents to the system 100, the Event Driven Workflow module 108 may direct the Document Automation AI 110 to process the documents based on need. As a non-limiting example, a TC 154 may upload a document and the Document Automation AI 110 may automatically read the document, determine its contents, classify the document, extract the relevant data from the document, determine whether that relevant data is proper based on context, and/or split the document into separate files to be attached to separate checklist items based on page ranges chosen from within the document, and so forth.

In some embodiments, the Risk Analysis AI 112 may be configured to automatically categorize documents into different risk tiers or quantify/score the risk associated with those documents based on various factors such as contextual information, document type, data extracted from the documents, and so forth. Together with the Document Automation AI 110, these two AI components may serve to perform automated document validation and acceptance using various techniques such as OCR, machine learning, rules engines, and so forth.

In some embodiments, the Document Automation AI 110 and the Risk Analysis AI 112 may be singularly integrated or operated together (e.g., by the Event Driven Workflow module 108), such that a document's type is immediately determined and the document is sorted into a particular risk tier (e.g., by the Risk Analysis AI 112) after it is ingested and processed (e.g., by the Document Automation AI 110). In other embodiments, the Event Driven Workflow module 108 may direct how and when the Document Automation AI 110 and the Risk Analysis AI 112 are utilized to process and score documents.

In some embodiments, large language models (LLM) calibrated to perform particular tasks may be used. An LLM fine-tuned on real estate transactions may be integrated, along with the Document Automation AI 110 and/or the Risk Analysis AI 112 into a conversational AI such as Chatbot AI 114, which can be used to carry out various tasks associated with the compliance review workflow. For instance, an auditor 152 may be able to converse with the Chatbot AI 114 and request that it check to see if a set of documents are properly signed. The system 100 may be able to retrieve the set of documents from the Transaction Database 134 and apply the Document Automation AI 110 and/or the Risk Analysis AI 112 to verify that the documents are properly signed, and then the Chatbot AI 114 may be able to accurately convey that information back to the auditor 152 in the conversation.

In some embodiments, the compliance review system 100 may include an AI Feedback module 118 that serves to implement a feedback loop for honing, training, and fine-tuning the various AI components of the compliance review system 100 that enable automation of the compliance review process. In some embodiments, the updating of these various AI components may be based on observed human decision-making and/or data collected by the Activity Logging module 124.

In some embodiments, the compliance review system 100 may include a Transaction Database 130 that is used to store data associated with each transaction. For example, all the documents uploaded to the compliance review system 100 in the course of performing the compliance workflow on a transaction may be stored in the Transaction Database 130. Data for a transaction may, additionally or alternatively, be stored with a transactional email address along with any communication and attachments sent to the address, which can be made available to the TCs 154 and the auditors 152. In some embodiments, documents may not be stored in the transaction database 130. For example, in some embodiments, document files can be stored on a disk, in cloud storage (e.g., a cloud storage bucket), etc. In some embodiments, the transaction database 130 can include information about files, metadata, etc. For example, in some embodiments, the transaction database 130 can store information indicating where a corresponding file can be found.

In some embodiments, the compliance review system 100 may include a Rules Database 132 that contains sets of rules for various jurisdictions that transactions may take place in. A particular jurisdiction may be associated with one or more sets of rules, and the specific ruleset that is utilized by the compliance review system 100 may depend on the nature of the transaction and the property. In some embodiments, the compliance review system 100 may include a Rules Engine 120 that may be used to generate and determine the checklists that are stored in the Checklist Database 134. The Rules Engine 120 may evaluate certain data points about a property or transaction and, if present, automatically change certain checklist items from "optional" to "required." Thus, the transactions for a particular jurisdiction may be further subject to different checklists and checklist items. In some embodiments, the compliance review system 100 can receive property information and can automatically determine, for example, a specific ruleset to use based on the property location, property type (e.g., condominium, apartment, co-op, single family home, single family home in a planned development, etc.), and/or any other relevant information.

In some embodiments, the compliance review system 100 may include a Checklist Database 134 that stores various checklists, each of which can be associated with a particular jurisdiction and the rules of that jurisdiction. For instance, a checklist may contain checklist items that describe the type(s) of document(s) that need to be validated in order to satisfy requirements for any given transaction for the associated jurisdiction. In some embodiments, the checklist listing the compliance requirements of one or more applicable jurisdictions can be specified or otherwise prepared by managing brokers associated with the compliance review system. In some embodiments, the checklist can be automatically populated by the system 100 based on the Rules Database 132 containing various compliance requirements organized by jurisdiction, and the applicable jurisdictions of the property as determined by the TCs 154, the Auditors 152, and/or the system 100. In some embodiments, the checklist lists the types of documents that can satisfy each compliance requirement or otherwise required by the system 100 for validation.

In some embodiments, the compliance review system 100 may include a Dynamic Checklist module 122 for manipulating or modifying these checklists. For instance, the Dynamic Checklist module 122 may automatically or selectively provide checklist template management as an admin function to various users (e.g., non-engineers) of the compliance review system 100 to allow them to make changes to the checklists and their items (e.g., listed types of documents acceptable for a particular compliance requirement) to better suit a particular transaction or set of transactions. TCs 154 may also be able to use the Dynamic Checklist module 122 to filter checklists based on the locality of the transaction property and property type. These dynamic checklists may allow for streamlined document creation and validation and also a unification of experiences for the TCs 154 and partner agents.

In some embodiments, the compliance review system 100 may include an Activity Logging module 124 that tracks and keeps a historical log of all activity performed by the TCs 154, the Auditors 152, the system itself, and/or other actors during the compliance review process. In some embodiments, the Activity Logging module 124 may track product metrics in order to improve understanding of how TCs, Auditors, and other users interact with the system.

FIGS. 2A and 2B are flowcharts that illustrate transaction coordinator and auditor workflows managed by a compliance review system according to some embodiments. At operation 202, the system can receive cover sheet information indicative of a new listing. At operation 204, the system can notify a TC (or a plurality of TCs) of the new listing. At operation 206, the system can receive a selection by a TC of a transaction. For example, the TC may open the new listing and select a checklist, or may directly select a checklist, for example as provided in the notification. At operation 208, the system can receive a selection of a checklist associated with the transaction. At operation 210, the system can receive a selection of a document associated with the selected checklist. At operation 212, the system can receive a checklist comment from a TC for an item in the selected checklist. At operation 214, the system can receive a document. For example, in some embodiments, the document can be received via e-mail (e.g., received in a monitored inbox), uploaded to the system, or otherwise made available to the system. In some embodiments, one or more checklist items can be associated with a document, and the user can provide documents for one or more checklist items. The checklist items can include, for example, listing documents, transaction documents, or both. At operation 216, the received document can be added to (e.g., associated with) the checklist, for example, associated with a particular item of the checklist. At operation 218, the system can send an auditor notification indicating that a new or modified document has been submitted. At operation 220, the system can receive feedback from an auditor. At operation 222, the system can notify the TC of the feedback. The feedback can indicate whether or not the document was accepted, can include comments related to the document or transaction, and so forth. If, at operation 224, no blocking issues were identified with the document, the system can accept the document at operation 226. If there were one or more blocking issues identified, the system can receive modifications at operation 228. The modifications can include, for example, edits to a document, a different uploaded document, etc. At operation 218, the system can notify the auditor that modifications have been received.

Turning to FIG. 2B, at operation 230, a system can receive a request from an auditor, for example, a request to review a checklist, review a transaction, review a listing, etc. At operation 232, the system can provide a queue to the auditor. The queue can include items, transactions, etc., that need the auditor's attention. At operation 234, the system can receive a selection of a transaction from the auditor. There can be different types of reviews conducted by an auditor. For example, in some cases, an auditor may review submitted documents associated with a transaction or checklist. In some other cases, an auditor may review requirements for a transaction, for example, to ensure that checklist items associated with a transaction are correct. At operation 236, the system can determine a review type, for example, based on a selection by an auditor. In a document review path, the system can, at operation 238, receive a selection of a document for review. For example, the auditor can click on a document to be reviewed. At operation 240, the system can provide the document to the auditor. At operation 242, after the auditor reviews the document, the system can receive feedback from the auditor. The feedback can include a comment, an indication that the document has been accepted or rejected, etc. At operation 244, the system can provide the feedback to a TC. For example, the system can generate a notification for the TC indicating that an auditor has reviewed the document.

In a requirements review flow, the system can receive from the auditor an indication of whether or not a particular checklist is a correct checklist. If, at operation 248, the checklist is not correct (or there is no checklist attached to the transaction), the system can receive an indication or selection of a correct checklist at operation 250. The system can, at operation 252, update a list of required documents for the checklist. For example, a checklist may be a correct checklist, but the auditor may wish to modify the checklist to require certain documents or to not require certain other documents. If, at operation 248, the checklist is the correct checklist, the system can proceed to operation 252. At operation 254, the system can provide a notification to a TC, which can indicate that a checklist has been reviewed and/or modified, for example by adding or removing a required and/or optional document.

As described in more detail herein, in some embodiments, not all documents may undergo review by an auditor. Rather, some documents may be automatically processed and/or analyzed by the system. In some embodiments, the system can be configured to accept or reject documents automatically under certain conditions.

Receiving End of Compliance Review System

In some embodiments, the compliance review system includes a receiving end that provides various tools and layouts to TCs for managing their workflow. For example, the system can provide a list view for a TC to see all of their in-flight audits and their statuses. In some embodiments, the system allows the TC to click on a specific audit to see a detailed view where actions could or need to be done. In some embodiments, the system includes prerequisite data checks that prevent a TC from starting an audit process until key data points are present. For example, the system may require a purchase agreement before the TC can proceed to the audit process.

In some embodiments, the system requests preliminary information ("cover sheet information") about the property to be listed from the TC, such as the year the property was built, if there will be tenants, the type of deal, the commission to be offered (e.g., as a percentage), and any HOA options. In some embodiments, the system gives the TC the option to select one or more applicable jurisdictions. In some embodiments, the system automatically selects one or more applicable jurisdictions based on, for example, the location of the property (e.g., per the address input by the TC) and/or any special features of the property (e.g., includes solar panels).

In some embodiments, the system displays the checklist of compliance requirements. In some embodiments, the system may also display, under each checklist item, a list of acceptable types of documents that may satisfy any given compliance requirement. In some embodiments, the system provides the TC with the option to filter the checklist based on the locality of the transaction property, property type, and/or other factors. In some embodiments, the system categorizes the documents into core documents (i.e., required) and optional documents. In some embodiments, the system includes an upload function for the TC to transmit documents from their device (e.g., a local hard drive) to the system, which may then store the documents in a database. In some embodiments, the system includes an attachment function that allows the TC to associate uploaded documents with specific checklist items. In some embodiments, the system provides the TC the option to choose page ranges within an uploaded document, then the system splits the selected page ranges as one or more separate documents (e.g., PDF files) that may be attached to separate checklist items. In some embodiments, the system includes a document splitting function that provides the TC with the option to preview the documents they had previously uploaded.

In some embodiments, the system is integrated with third-party data services or data suppliers. For example, the system may request or retrieve specific documents directly from a third-party data service, such as via an API. As a more specific example of this, the system may be configured to allow TCs to order an NHD or tenant flood report from a third-party data service, such as ClearNHD, from within the system. As another example, the system may be integrated with various data vendors, such as a home warranty vendor or title insurance provider. A user of the system (e.g., a TC) may be able to order-through a user interface-a home warranty policy or title insurance policy from a third-party data vendor, such as Super Home Warranty. In some embodiments, the system can restrict a TC from adding or uploading additional documents until either a Tax or Prelim Report document has been attached, which can increase Auditor efficiency since a Tax or Prelim Report document may be used to verify property ownership and validate all other documents in the audit process. In some embodiments, the system includes an email function that sends notes and alerts to TCs to know when they need to address issues in their audit processes. In some embodiments, the email function can also alert TCs of upcoming listing expirations and missing checklist requirements.

FIGS. 3A-3I show flowcharts illustrating example workflows managed by a compliance review system according to some embodiments.

Figure 3A:
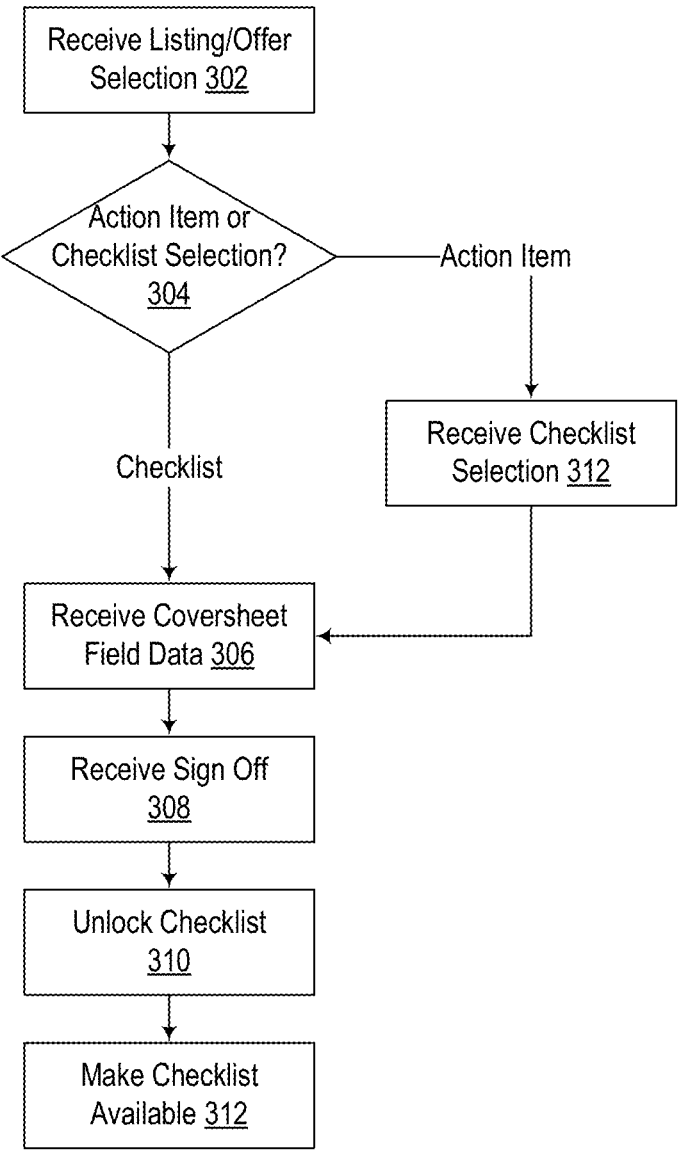

FIG. 3A illustrates an example new audit workflow. At operation 302, a system can receive a listing or offer selection from a user (e.g., an auditor or TC). At operation 304, the system can determine if the user has selected an action item or a checklist. For example, in some embodiments, the system can provide a list of action items to the user and the user can select an action item. The action item can correspond to, for example, a particular listing or transaction. At operation 304, if the user selected an action item, the system can receive a selection of a checklist at operation 312. In some cases, the user may directly select a checklist rather than selecting an action item and then selecting a checklist. At operation 306, the system can receive coversheet field data from the user. At operation 308, the system can receive a sign off from the user. The sign off can indicate, for example, that the user is finished entering coversheet field data. At operation 310, the system can unlock the checklist. At operation 312, the system can make the checklist available for the user or for other users.

Figure 3B:
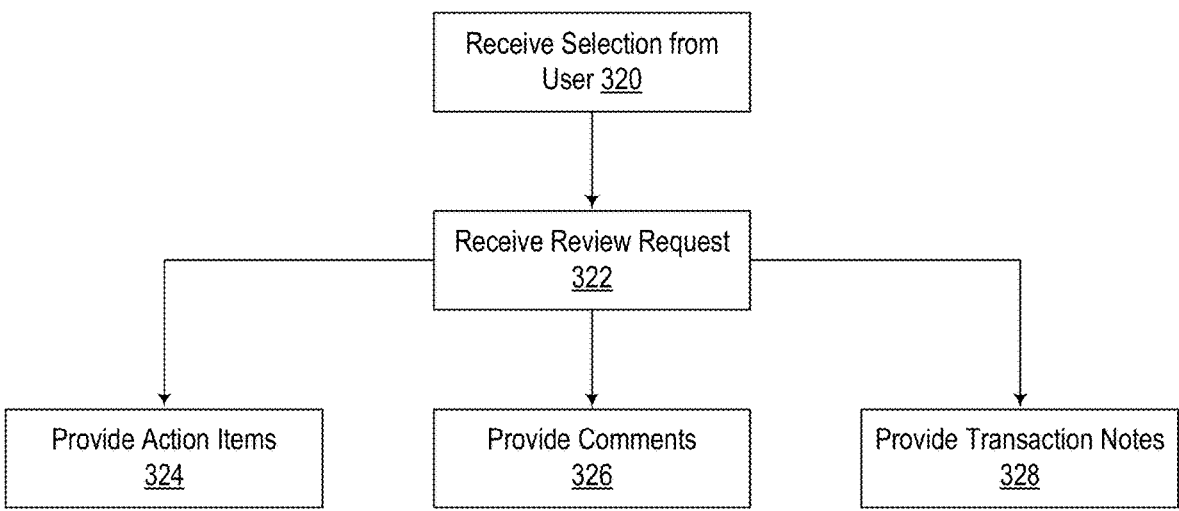

FIG. 3B illustrates an example process audit communications process according to some embodiments. At operation 320, a system can receive a selection from a user (e.g., a TC) for a particular transaction or listing. At operation 322, the system can receive a review request to review a particular document, checklist, etc. The system can be configured to provide various information to the user. For example, at operation 324, the system can provide a list of action items to the user. The action items can indicate, for example, what needs to be reviewed, submitted, etc. The system can, at operation 328, provide comments to the user. At operation 328, the system can provide transaction notes to the user. Comments can be, for example, checklist comments. Transaction notes can be information relating to the transaction that is only displayed to the user after auditor review.

Figure 3C:
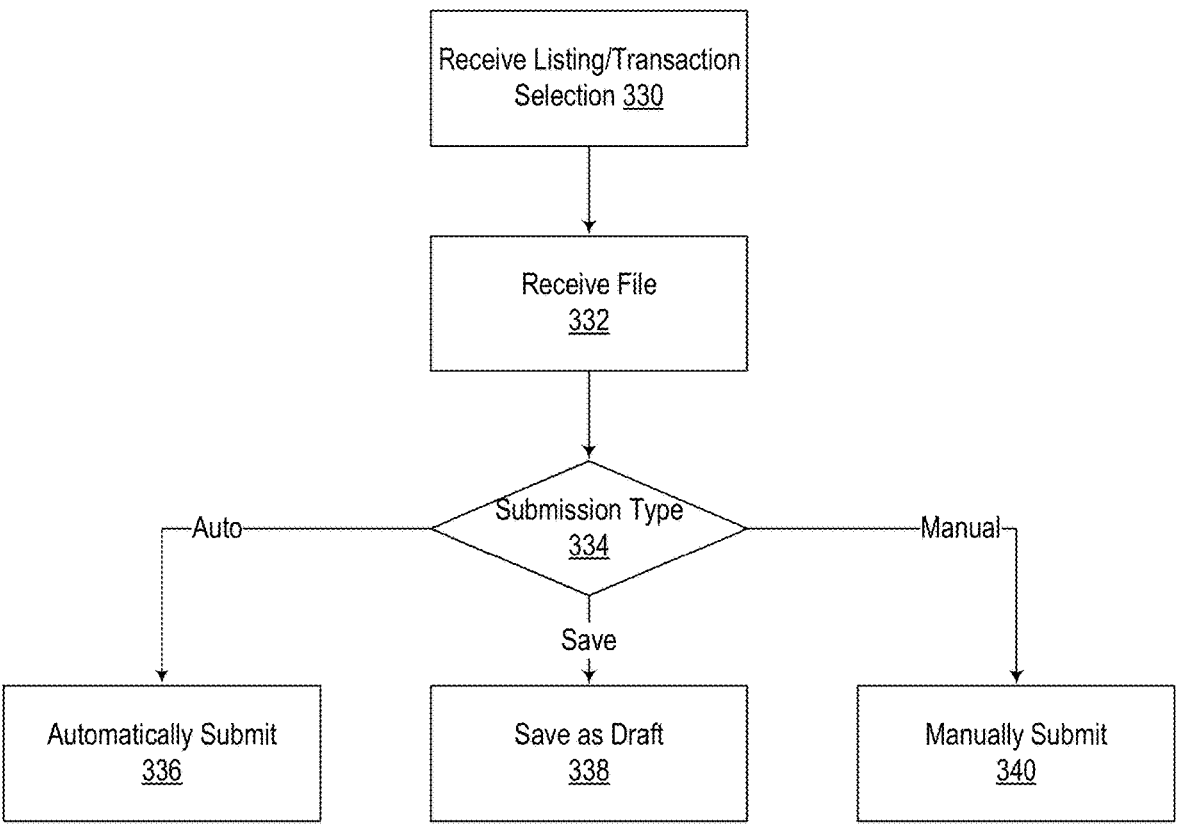

FIG. 3C illustrates an example process for submitting documents according to some embodiments. In some embodiments, a document can be associated with one or more checklist items. At operation 330, a system can receive a user selection of a listing or transaction. At operation 332, the system can receive a file. The file can be associated with a checklist item. As described herein, the file can include a plurality of documents, for example in a compressed archive (e.g., zip file) or a PDF that contains multiple documents that have been combined together into a single file. In some embodiments, the system can be configured to split the file into a plurality of documents, for example, as described herein. At operation 334, the system can determine a submission type. Depending upon the type of document being submitted, risk levels associated with the document, and so forth, the system may automatically submit the document at operation 336 or may manually submit the document at operation 340. In the case of manual submission, a user may indicate that the document is ready to submit. In some embodiments, rather than automatically or manually submitting the document, the system can save the document as a draft at operation 338. Saving the document as a draft can allow the user to come back to the document later, for example, to make edits to the document, to review the document for completeness and/or correctness, etc.

Figure 3D:
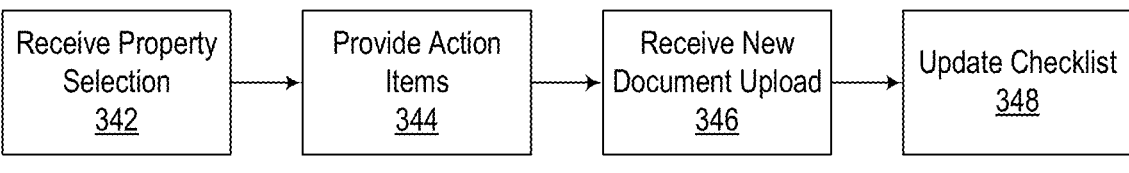

FIG. 3D illustrates an example document upload process according to some embodiments. At operation 342, a system can receive a selection of a property from a user. At operation 344, the system can provide a list of one or more action items to the user. At operation 346, the system can receive a new document upload. The new document can correspond to one or more action items. The action items can indicate outstanding items on a checklist. At operation 348, the system can update the checklist based on the uploaded document. For example, if a lead paint disclosure was missing and the user submitted a lead paint disclosure, the system can mark the lead paint disclosure checklist item as complete, pending review, etc. The status can depend upon whether or not the document was automatically accepted or will only potentially be accepted after at least partially manual review. For example, in some embodiments, as described herein, a document can be automatically accepted if the document is associated with a risk level below a threshold amount.

Figure 3E:
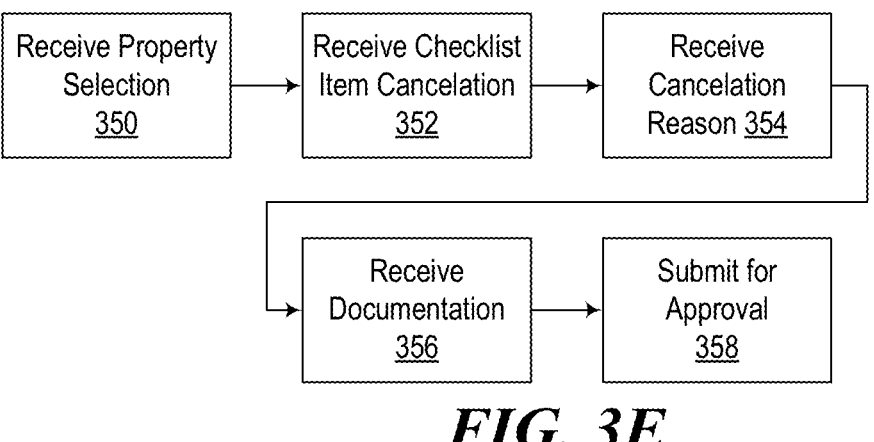

FIG. 3E illustrates an example process for canceling a checklist item according to some embodiments. In some cases, a checklist item can be canceled because, for example, it was added by mistake, the item is no longer relevant, etc. However, it can be important to ensure that a user does not cancel or remove checklist items without good reason. It is anticipated that, using the techniques described herein, checklists will typically be automatically populated and may be able to automatically adapt based on new information that is received. However, there may still be circumstances where manual editing of a checklist is significant. At operation 350, a system can receive a property selection from a user. At operation 352, the system can receive an indication to cancel or remove a checklist item of a checklist. At operation 354, the system can receive a cancelation reason. For example, the system may provide a GUI with radio buttons, checkboxes, a dropdown, a freeform text field, etc., that the user can use to provide a reason for the cancelation. At operation 356, the system can receive documentation relating to the cancelation. The documentation may provide additional context for why the checklist item is being canceled. At operation 358, the user can submit the cancelation request for approval. In some cases, cancelations can be automatically approved. For example, if a checklist item is identified as optional, the system may be configured to cancel the item without further approval. In some cases, a checklist item may require approval (e.g., approval following human review) to cancel the checklist item. For example, if a checklist item is identified as required, a greater level of review may be required by the system before the checklist item is canceled.

Figure 3F:
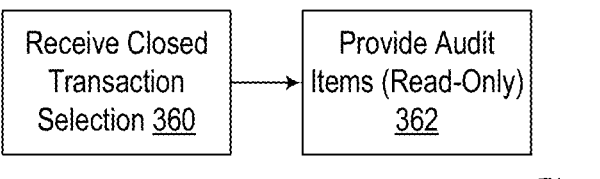

FIG. 3F illustrates an example process for reviewing a closed transaction according to some implementations. in some cases, it can be beneficial to review a closed transaction, for example in cases where a problem arises after a transaction closes, in situations where a listing was closed without a sale going through, and so forth. At operation 360, a system can receive a user selection of a closed transaction. While review of closed transactions can be beneficial, it can be important to ensure that a user reviewing a closed transaction is unable to make edits to the transaction. At operation 362, the system can provide audit items relating to the closed transaction to the user. In some embodiments, the audit items can be provided in a read-only format, such that the user is unable to modify the audit items.

Figure 3G:
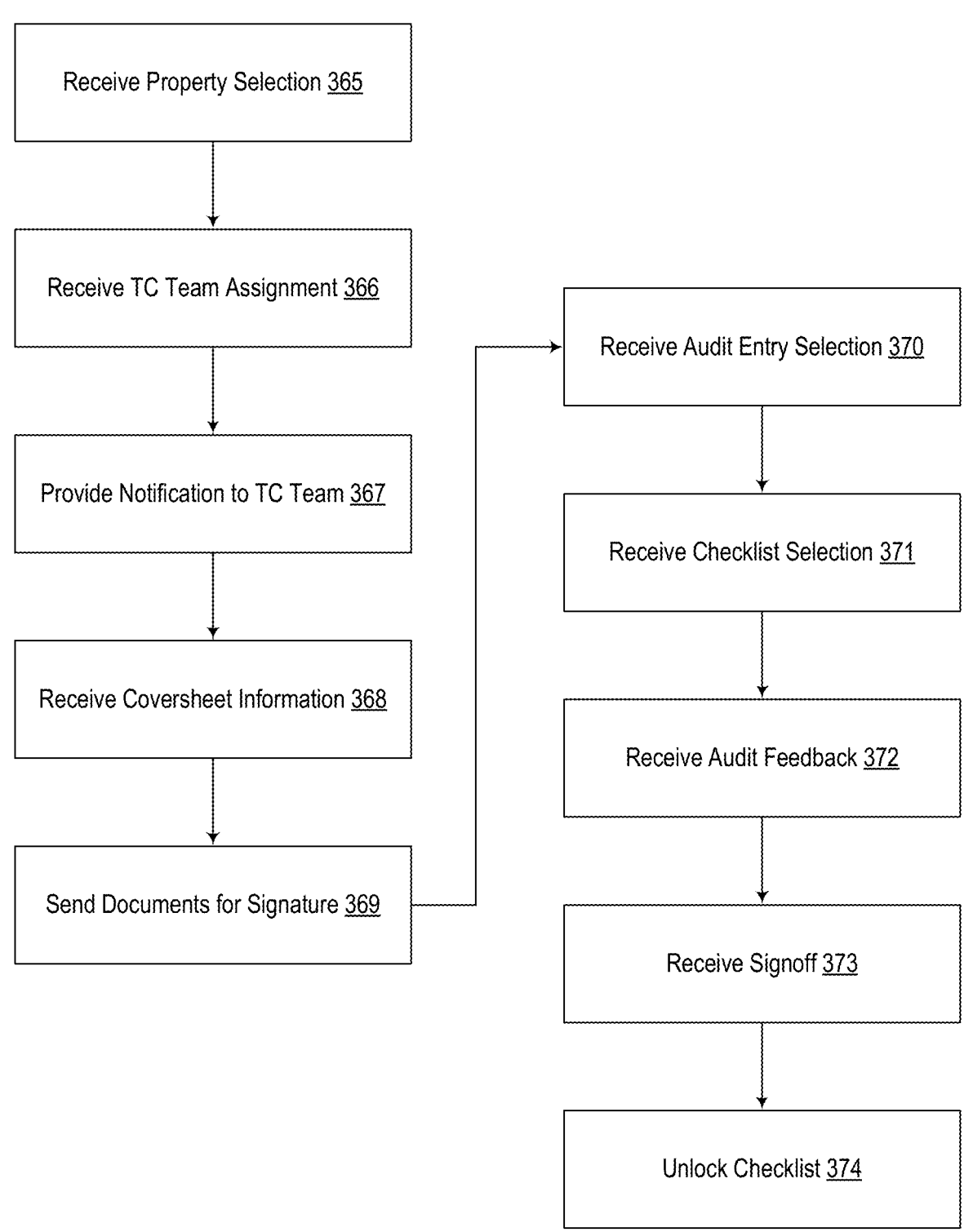

FIG. 3G illustrates an example process for assigning a TC team and receiving checklist feedback according to some embodiments. At operation 365, the system can receive a property selection from a user (e.g., from an agent). The property can, in some embodiments, be a new property (e.g., a new listing). At operation 366, the system can receive a TC team assignment. For example, in some embodiments, the user may select a TC team. In some embodiments, the system can automatically select a TC team, for example, based upon location, experience, capacity, etc. At operation 367, the system can provide a notification to the TC team indicating actions to be taken with respect to the property. At operation 368, the system can receive coversheet information from a TC on the TC team. At operation 369, once the TC has finished entering information, the system can send one or more documents for signature to parties who need to sign. At operation 370, the system can receive an audit entry selection, for example, indicating that another user is ready to perform an audit of one or more documents. At operation 371, the system can receive a checklist selection. In response, the system can provide the checklist and outstanding audit items. At operation 372, the system can receive audit feedback, which can indicate that one or more items in a checklist require revision, are missing, etc. In some embodiments, the audit feedback may indicate that the checklist is complete. At operation 373, the system can receive a signoff indicating that the audit is complete. It will be appreciated that the audit being complete does not necessarily mean that the checklist is complete or that the documents are in condition to move forward. Rather, the sign off may simply indicate that the audit is finished, although there may be more work to do. At operation 374, the system can unlock the checklist so that a TC can make changes, review comments left during the audit, etc. For example, the TC may upload a new document to replace a document that was not accepted or to provide a document that was missing.

Figure 3H:
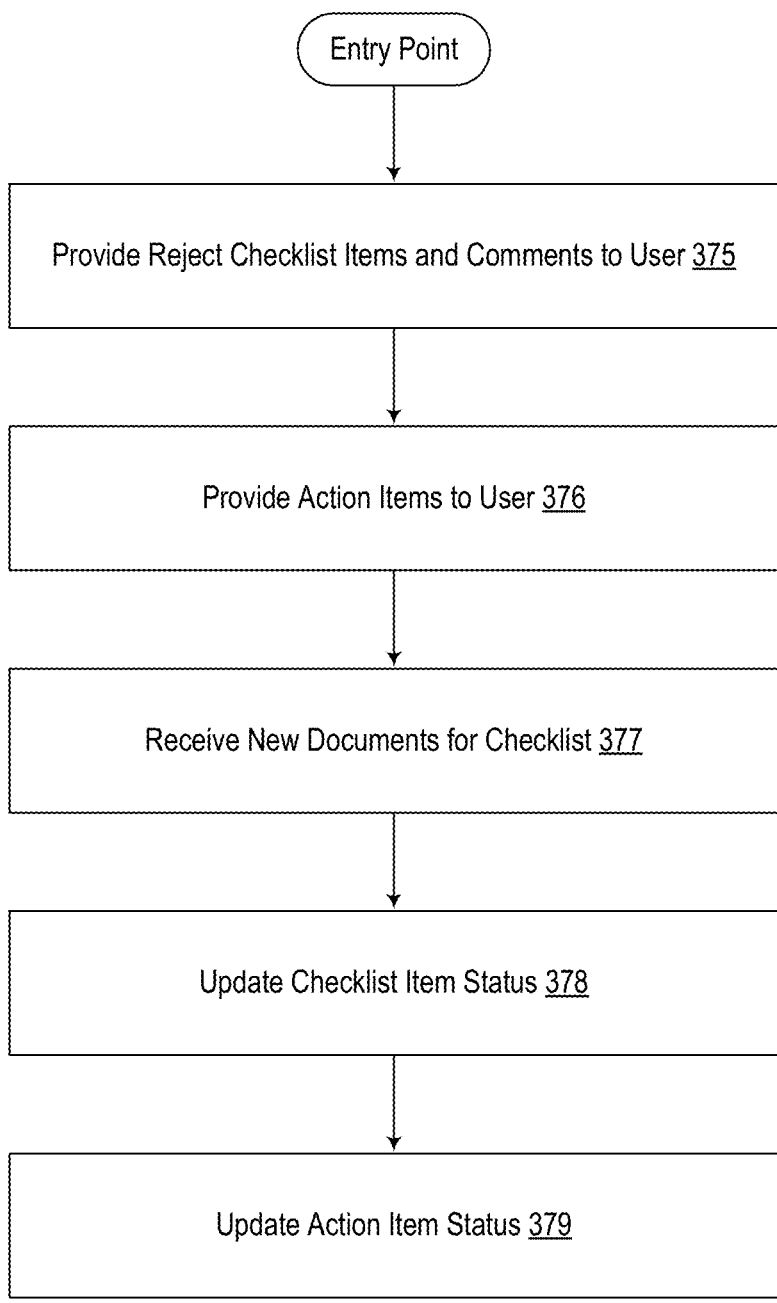

FIG. 3H is a flowchart that indicates an example process for resolving action items (for example, as identified during an audit) according to some embodiments. A user (e.g., a TC) may access an action item list and/or a checklist to review outstanding issues. At operation 375, the system can provide a checklist to the user. The checklist can include or enable the display of rejected checklist items and/or comments to the user. At operation 376, the system can provide a list of action items to the user. In some embodiments, the user may view the rejected checklist items or the action items, but not both. In some embodiments, action items can be provided first, and the checklist items can be shown to the user upon the user selecting an action item. At operation 377, the system can receive one or more new or revised documents for one or more checklist items. For example, the user may upload new or revised documents for checklist items that were rejected. In some embodiments, the user may review comments that indicate why a previously-submitted document was rejected, which can help inform the user of what needs to be done to correct the issue or issues that caused the document to be rejected. At operation 378, the system can update one or more checklist items to indicate a new status. For example, in response to the user uploading a new or modified document for a checklist item, the status of the checklist item can change from rejected to accepted or from rejected to under review, for example, depending upon whether the uploaded document was automatically accepted or will undergo further review before being accepted. At operation 379, the system can upload an action item status for an action item. For example, if a user uploaded a new or modified document, an action item associated with the document can change from open to resolved.

Many of the operations described with respect to FIGS. 3A-3H can be automated, for example using machine learning models, natural language processing, optical character recognition, etc. Some operations can be partially or fully automated by pulling data from authoritative sources such as property records, postal records, MLS data, and so forth. In some embodiments, automated review systems can identify potential errors, omissions, and so forth.

Figure 3I:
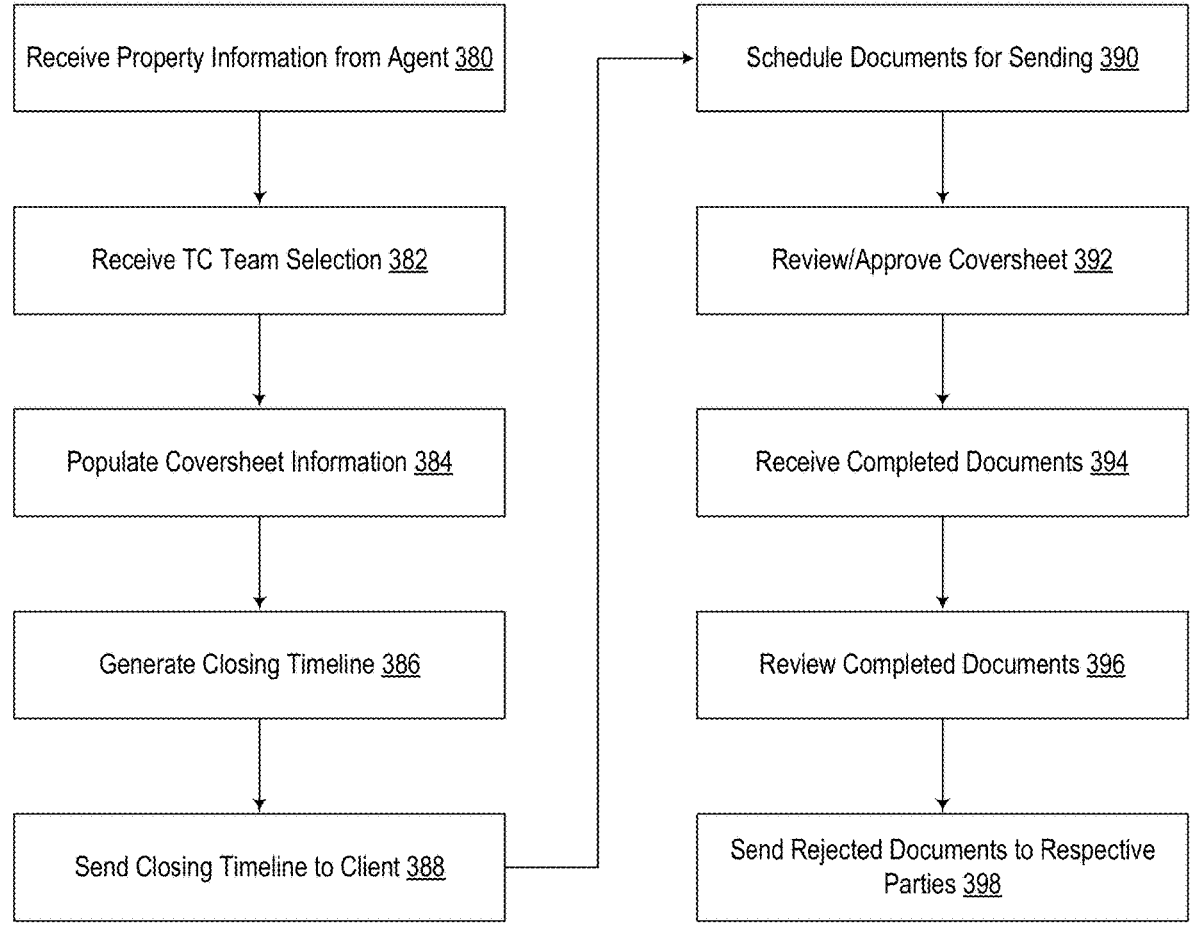

FIG. 3I is a flowchart that illustrates an example process flow that uses automated data population and automated compliance review according to some embodiments. At operation 380, a system can recent property information from an agent. For example, an agent can submit information about a new property that is for sale. At operation 382, the system can receive a selection of a TC team. In some embodiments, the agent can select a TC team. In some embodiments, a TC team can be selected by the system, for example as described herein. At operation 384, the system can populate coversheet information, which can include basic information about the listing (e.g., property address, listing price, square footage, number of bedrooms, number of bathrooms, school district, etc.). In some embodiments, the system can populate the coversheet information based on information supplied by an agent of TC. In some embodiments, the system can advantageously automatically populate the coversheet information based on, for example, data retrieved from one or more data sources, such as MLS listings. In some embodiments, information can be automatically populated based on, for example, the property location (which can indicate, for example, school district), previous transactions, or any other source of information. At operation 386, the system can determine a closing timeline. For example, the system can determine a closing timeline with various events based on, for example, the location of the property. In some embodiments, a user may be able to modify the timeline. At operation 388, the system can send the closing timeline to a client. In some embodiments, the system can send calendar invitations, reminders, and/or the like to the client, which can help reduce the likelihood of important dates being missed, which could delay closing. At operation 390, the system can schedule the sending of documents. For example, the system can automatically send electronic documents for signature based on the closing timeline. At operation 392, the system can automatically review the coversheet information to determine the completeness, correctness, or both of the coversheet information. At operation 392, the system can receive completed documents. For example, the system can receive completed electronic documents. The system can be configured to automatically split the documents, assign the documents, and/or submit the documents for audit. In some embodiments, the system can receive documents other than completed electronic documents, such as documents prepared by a bank, another agent, etc. In some embodiments, received documents can include documents that were printed and later scanned. In some embodiments, received documents can include documents with electronic signatures. In some embodiments, received documents can include documents with wet ink signatures. At operation 396, the system can automatically review the received completed documents, for example, to check for consistency, completeness, compliance with signature requirements, etc., for example, as described herein. At operation 398, the system can notify respective parties (e.g., agents, lenders, etc.) that one or more documents were rejected. The system may reject a document for a variety of reasons, such as inability to parse the document (e.g., due to poor scan quality), missing information, incorrect information, a document being an incorrect document (e.g., the wrong form was submitted), etc. The respective parties can receive notification of a rejected document and take action to correct the issue.

FIGS. 4A and 4B show transaction coordinator-side user interfaces 400 of a compliance review system according to some embodiments. FIG. 4A shows a user interface view showing a checklist with associated checklist items. Each checklist item can have an icon indicating if a document has been uploaded, an icon indicating if a comment has been added, a status, and/or functionality to access one or more options, such as changing an item from required to optional, removing an item, etc. The user interface can include various tabs that can display, for example, action items, unassigned documents (e.g., documents not assigned to a specific checklist item), and/or an audit log. In some embodiments, a user can upload documents, for example, by clicking an upload button. In some embodiments, a user can assign documents, for example, by associating an uploaded document with a checklist item, which, in some cases, can be accomplished by dragging an uploaded document to a checklist item. In some embodiments, uploaded documents can automatically be associated with a checklist item, for example, based on name, contents, etc.

FIG. 4B shows a portion of a user interface displaying an audit log according to some embodiments. Various information can be shown in the audit log, and the information is not necessarily limited to what is illustrated in FIG. 4B, nor is the information shown in FIG. 4B necessary or required. In FIG. 4B, the audit log shows timestamps, a user who took an action, the type of action taken, and a description of the action. A user can be a human user such as an agent, auditor, etc., or can be a system component, such as a compliance system. For example, FIG. 4B shows that a compliance system can route a document for review, reject a document based on an automated review, or accept a document based on automated review. There can be a large number of events in an audit log. Thus, in some embodiments, it can be advantageous to prove a filtering option that allows users to select events that are of interest.

System Overview

FIG. 5 is a block diagram illustrating an overview of devices on which some implementations of the compliance review system can operate. The devices can comprise hardware components of a device 500 with an operating system (OS) 562. Device 500 can include one or more input devices 520, that provide input to the CPU(s) (processor) 510, notifying it of actions. The actions can be mediated by a hardware controller that interprets the signals received from the input device and communicates the information to the CPU 510 using a communication protocol. Input devices 520 include, for example, a mouse, a keyboard, a touchscreen, an infrared sensor, a touchpad, a wearable input device, a camera- or image-based input device such as a scanner, a microphone, or other user input devices.

CPU 510 can be a single processing unit or multiple processing units in a device or distributed across multiple devices. CPU 510 can be coupled to other hardware devices, for example, with the use of a bus, such as a PCI bus or SCSI bus. The CPU 510 can communicate with a hardware controller for devices, such as a display 530. Display 530 can be used to display text and graphics. In some implementations, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices include: an LCD screen, an LED display screen, a projected, holographic, or augmented reality display (such as a heads-up display device or a head-mounted device), and so on. Other I/O devices 540 can also be coupled to the processor, such as a network card, video card, audio card, USB, firewire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols, a Q-LAN protocol, or others. Device 500 can utilize the communication device to distribute operations across multiple network devices.

The CPU 510 can have access to a memory 550 in a device or distributed across multiple devices. A memory includes one or more of various hardware devices for volatile and non-volatile storage, and can include read-only and/or writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 550 can include program memory 560 that stores programs and software, such as the OS 562 and other application programs 564. Memory 550 can also include data memory 570 that can include data to be operated on by applications, configuration data, settings, options, preferences, etc., which can be provided to the program memory 560 or any element of the device 500.

Some implementations can be operational with numerous other computing system environments or configurations. Examples of computing systems, environments, and/or configurations that may be suitable for use with the technology include, but are not limited to, personal computers, I/O systems, networked peripherals, video conference consoles, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

FIG. 6 is a block diagram illustrating an overview of an environment 600 in which some implementations of the compliance review system can operate. Environment 600 can include one or more client computing devices 605A-H, examples of which can include system 100. In the illustrated embodiment, device 605A is a wireless smartphone or tablet, device 605B is a desktop computer, device 605C is a computer system, device 605D is a wireless laptop, device 605E is a smart watch, and device 605F is a networked camera system. These are only examples of some of the devices, and other embodiments can include other computing devices. Client computing devices 605 can operate in a networked environment using logical connections through network 630 to one or more remote computers, such as a server computing device.

In some implementations, server 610 can be an edge server which receives client requests and coordinates fulfillment of those requests through other servers, such as servers 620A-C. Server computing devices 610 and 620 can comprise computing systems, such as system 100. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers. In some embodiments, each server 620 can operate on the same physical hardware, for example, as virtualized servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g., store) information. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can be other wired or wireless networks. Portions of network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Risk Management of Compliance Review System

Given the volume and complexity of documents associated with real estate transactions, manual review can be costly and time-consuming, so automating the approval of certain documents can make the compliance review or audit process faster, cheaper, and/or more reliable. However, because automation of document approval carries an inherent risk of false negatives, the risk and the associated liability may be balanced against the benefits of automation.

In some embodiments, once the TC has uploaded at least one document, the compliance review system may scan the document to determine whether the document can be approved by the system or the document needs to be reviewed by a human Auditor. In some embodiments, the system may utilize optical character recognition (OCR), machine learning (ML), artificial intelligence (AI), large language models (LLMs), and/or natural language processing (NLP) techniques to scan, determine the contents of, and/or identify certain features (e.g., signatures) in the document. One or more of these techniques may be used together in order to automate the reading and processing of documents. For instance, AI may be used in order to determine if a particular document has the right information (e.g., the appropriate fields are filled in and those fields are filled in correctly), that the proper signatures are provided (e.g., the signatures correspond to the correct person, the signatures are in the proper format such as electronic/wet in compliance with jurisdictional rules, and so forth), and that any changes to the form are accounted for. In some embodiments, the AI may be configured to identify and process specific regions of interest associated with a particular type of document. For instance, there may be a type of document for which only a couple sections of the document include fillable fields or signature lines, and the AI may be configured to home in on those sections.

In some embodiments, the document processing AI may be able to extract text from a particular document (e.g., name, address, etc.), and it may store the extracted data along with metadata (e.g., document id, transaction id) in a database. In addition to OCR, any number of techniques may be used to extract this information, and such techniques may include document boundary detection, document classification, out-of-context extraction, keyword-based classification, image-based classification, pattern-based classification, template-based matching, template-based matching with rules-based templates, and so forth.

In some embodiments, the document processing AI may be able to perform OCR on scanned documents. The AI may be able to process the contents of those documents using NLP, an LLM, etc., and identify the content within those documents that is needed for auditing, extract data from that content, and present that data where/when auditors may need it within the workflows described herein. The document processing AI may also be able to process content within communications (such as email, chat, comments, audit summaries, canned responses), extract any relevant data, and then present that data where/when auditors may need it within the workflow described herein. For example, the system may provide to auditors a dashboard that displays notifications and alerts for missing or incorrect documents or missing/incorrect data within a particular document.

In some embodiments, the system may automatically approve a document upon determining that the type of the document is inherently low-risk. In some embodiments, documents deemed to be inherently low-risk include Buyer's Inspection Advisory, Fair Housing Discrimination Advisory, Wire Fraud Advisory, State Consumer Privacy Act Advisory, Home Warranty, Additional Agent Acknowledgement, Additional Brokerage Acknowledgement, Request for Repairs/Response, Escrow Docs, Fire Hardening and Defensible Space Advisory, Statewide Buyer & Seller Advisory, Market Conditions Advisory, Water Conserving Plumbing & Carbon Monoxide Advisory, Electronic Signature Advisory, Square Footage & Lot Size Disclosure, Environmental Hazards Handbook Receipt, Side Affiliated Business Arrangement, platform-provided notices, Local County/City Disclosures, Trust Advisory, Residential Earthquake Hazard Report, Propane Tank Addendum, Parking & Storage Disclosure (e.g., for condos or other housing with shared space), Buyers HOA Advisory, HOA Information Request, HOA Required Statutory disclosures, HOA Required Non-Statutory disclosures, HOA Document Package, Water Heater Statement of Compliance, Historical Disclosures, and/or other miscellaneous disclosures.

In some embodiments, the system can categorize a document into one of several risk tiers (e.g., two risk tiers, three risk tiers, four risk tiers, five risk tiers, etc.). The risk tier can indicate a level of potential risk associated with the document. For example, a first risk tier can include inherently low-risk documents, while a highest risk tier can include documents where an error or omission could compromise a transaction. For example, in a first risk tier, the system may automatically reject documents based on the time at which they were uploaded (e.g., if a document was uploaded before tax records were submitted) or automatically accept documents based on where they originated (e.g., if a document package originated from the system or uses a system template). In a second risk tier, the system may confirm whether (i) an uploaded document is the correct type and (ii) the uploaded document is fully executed with one or more signatures that match the one or more names on the cover sheet. In some embodiments, the system may check that signatures exist but may not check that the names match names on other documents as a cover sheet. In some embodiments, the second risk tier may apply to common, high-volume documents. In a third risk tier, the system may confirm whether (i) an uploaded document is the correct type and (ii) selected document fields with well-structured data (e.g., originating from the platform or government-issued form) match the data on the cover sheet. In a fourth risk tier, the system may automatically review more complex documents with unstructured data that need to be compared against one or more other documents in the file. In some embodiments, examples of unstructured data can include freeform text (as opposed to predefined checkboxes), such as a description in an inspection report. In a fifth risk tier, the system may require human review while also observing the human review process to build an AI/ML model that uses human interactions and decision-making to realize automation of the most complex documents. In some embodiments, for example, an Addendum may trigger a new checklist requirement.

In some embodiments, the system provides a Productization of Risk Score to facilitate dynamic acceptance criteria based on locale, transaction attributes, TC attributes, etc. In some embodiments, the system includes a rules engine that evaluates certain data points about a property and, if present, automatically changes certain checklist items from "optional" to "required." In some embodiments, the system includes a rules engine that can automate the marking of checklist items as required based on property attributes. In some embodiments, the system includes filters and restrictions to prevent incomplete data from being synced to downstream systems. In some embodiments, the platform includes a risk function that can include TC evaluations based on historical performance. For example, if a particular TC is marked as "low risk" or has a high reliability score, the system may automatically accept documents attached to certain checklist items by that particular TC, while the same documents may not be automatically accepted when submitted by a TC with a higher risk or lower reliability. In another example, in calculating a TC reliability score, the system may review a 180-day period (or a different period) of the TC's recent history and calculate what percentage of documents uploaded by the TC were approved the first time. In some embodiments, the system includes automated document validation and acceptance using OCR, machine learning, AI, and/or additions to the rules engines.

In some embodiments, the system may use AI/ML techniques in order to perform the risk analysis and assessment. The AI/ML component used to perform the risk analysis and assessment and the AI/ML component used to read and process documents may be separate or may be integrated, such as by seamlessly working together to process documents and performing risk analysis based on those documents.

In some embodiments, upon reviewing a document, the system can accept the document, reject the document, or flag the document as "unsure." In some embodiments, the system keeps a log of its decisions in order to maintain a complete audit history. In some embodiments, when the system rejects a document, the system provides a reasoning to the TC or primary agent so the TC or primary agent can correct the document for approval. In some embodiments, the system may identify an exception or anomaly (e.g., when the data in a particular field does not match what was expected based on the cover sheet or another document or other information) and either reject the document or flag the document as "unsure." In some embodiments, documents flagged as "unsure" are subject to manual review (e.g., by an auditor, a member of the compliance team, a managing broker, etc.). In some embodiments, manual review may include an escalation process such that if an auditor is unable to determine whether a document is compliant, the document is escalated to the managing broker. In some embodiments, the system allows users to manually re-assign a risk level to a document to address special cases as needed. In some embodiments, during the early stages of automation of the system, moderate and high-risk documents may continue to be subject to manual review. In some embodiments, the system can take state requirements for broker review into consideration. For example, the system may randomly select a limited number of documents for monthly broker review.

Reviewing End of Compliance Review System

In some embodiments, the system includes a reviewing end for managing the workflow of the Auditors. The reviewing end can display the one or more documents uploaded by the TC and the checklist used by the TC. In some embodiments, the Auditor may click various documents organized into different compliance requirement checklist items to view those documents in full. In some embodiments, the system allows an Auditor to create a custom checklist item for a specific audit.

In some embodiments, the system includes statuses and stages that the Auditors can set on each audit to facilitate workflows within their department, and to trigger synchronization with other systems. In some embodiments, the system provides a tabular view for an Auditor to see all in-flight audits and their statuses and/or allows the Auditor to click on a specific audit to see a detailed view where actions could be done. In some embodiments, the system may allow the Auditor to filter and sort their audits and documents to facilitate more efficient workflow.

In some embodiments, the system may allow the Auditor to notify the TC that the TC or the system selected the incorrect jurisdiction for the checklist and/or start a new checklist corresponding to the proper jurisdiction. In some embodiments, the system may allow the Auditor to either approve or reject a document as satisfying a particular compliance requirement checklist item. In some embodiments, the system allows the Auditor to send comments to the TC (e.g., regarding reasons for a rejection, matters that need to be addressed in the audit, etc.).

As described herein, it can be important to extract information from documents. Often, documents are submitted after being scanned, and thus may not include text in a computer-readable format. OCR can be used to extract text from image data (e.g., from scanned documents).

FIG. 7 is a flowchart that illustrates a process for extracting information from a document (e.g., a PDF) according to some embodiments. At operation 702, a user can upload a document (e.g., a PDF) or otherwise make a document available, for example, via email. At operation 704, a compliance system can send the document to a classifier endpoint. At operation 706, the document can determine the document type, for example, based on the content of the first page, the general layout of the first page, etc. If the system cannot identify the document type, the process can stop. If the classifier system can identify the document type, the process can continue. At operation 708, the compliance system can send the document or a portion thereof to an extractor. At operation 710, the extractor can extract one or more target values from the document. At operation 712, the compliance system can render the extracted values on a form, e.g., on the same form as the form that was uploaded by the user at operation 702. At operation 714, the user can update one or more values, for example, to correct errors made by the extractor at operation 710. At operation 716, the compliance system can determine if the user accepted the extracted values or adjusted one or more extracted values. At operation 718, the extractor model can be retrained based on the user feedback, which can result in improved performance of the extractor model over time.

FIG. 8 is a flowchart that illustrates an example extraction process according to some embodiments. The process shown in FIG. 8 can use template-based extraction. At operation 802, a user can submit a document corresponding to a checklist item. At operation 804, a system can determine if the document is a type of document for which there are established rules. For example, documents associated with certain checklist items can include forms or otherwise structured information for which rules may exist. In some cases, a checklist item may accept a document, such as an addendum, with no known format. At operation 806, if there are no rules for the document, the process can stop. If, at operation 806, there is at least one rule for the document, the system can retrieve the rules from a compliance database at operation 808. At operation 810, if the system has not previously parsed a template associated with the document, the system can store the template in a document template repository at operation 812. At operation 814, the system can perform OCR on the document template. In some embodiments, the system may not perform OCR on the document template because, for example, the system has previously performed OCR and stored the results, or important information about the template (e.g., the location of values to be extracted) is already defined. at operation 816, the system can, if not previously performed, store the OCRed template in the compliance database. If, at operation 810, the system has previously parsed the matching template, the system can get the template at operation 818. At operation 820, the system can detect the template in the submitted document. For example, the document may include a portion matching the template as well as other portions that do not match the template (for example, because multiple documents were combined into a single file). At operation 822, the system can store the submitted document. At operation 824, if the system was unable to detect the template in the document, the process can stop. If, at operation 824, the system was able to detect the template, the system can perform additional operations at operation 826. For example, at operation 826, the system can store a range of pages in the document that match the template. In some embodiments, the system can, at operation 826, split the submitted document to generate one or more PDFs or other files, for example, comprising a file that represents only the pages that match the template.

FIG. 9 illustrates an example process for updating an extraction model according to some embodiments. At operation 910, a system can receive a document, for example, via email, via upload, etc. At operation 920, the system can determine a document type. In some embodiments, the system can determine the document type by parsing the contents of the document. In some embodiments, a user can specify a type of document, for example, as part of an email subject or body, by selecting a document type from a dropdown menu on a website or in an application, and so forth. In some embodiments, the document type can be determined based on a checklist item associated with the document. At operation 930, the system can extract data from the document. In some embodiments, the system can extract one or more values associated with one or more keys from the document (e.g., a value that is part of a key-value pair). At operation 940, the system can display the extracted data to the user. For example, in some embodiments, the system can show the extracted data to the user in a tabular format, superimposed or overlayed onto a form, or in any other way. At operation 950, the system can receive one or more corrections from the user. In the process of FIG. 9, the user can indicate, for example, corrected values for different keys. At operation 960, the system can analyze the document to determine where the correct values are located within the document. At operation 970, the system can update an extraction model based on the determined locations of the correct values. This can be beneficial if, for example, a form is revised and information is relocated on a form.

FIG. 10 illustrates another example process for updating an extraction model according to some embodiments. At operation 1010, a system can receive a document, for example, via email, upload, etc. At operation 1020, the system can determine a document type, for example, as described above with respect to FIG. 9. At operation 1030, the system can extract data from the document. At operation 1040, the system can cause the extracted values to be displayed to the user, for example, as described above with respect to FIG. 9. At operation 1050, the system can receive an indication of a correct location for a value from a user. For example, the system can cause a user interface to be displayed to the user, and the user can draw a bounding box around a region in the document where the correct value can be found. At operation 1060, the system can update an extraction model based on the received location of the information. As with FIG. 9, such a process can be beneficial when there is a new or different version of a document that places information in different locations.

FIG. 11 is a flowchart that illustrates an example process for determining document completeness according to some embodiments. At operation 1102, a system can receive a document submitted by a user, by another system, etc. In some embodiments, the document can be associated with a checklist item. At operation 1104, the system can determine a document type, for example, by analyzing the contents of the document, the filename of the document, a checklist item associated with the document, or a document type label associated with the document. At operation 1106, the system can extract information from the document, for example, one or more values corresponding to one or more keys. At operation 1108, the system can verify document completeness. For example, there can be multiple keys associated with a document, not all of which may be required. In some embodiments, the system can check that all required keys have values associated therewith. Requirements can be identified in, for example, a rules database. At operation 1110, if the document is not complete, the system can reject the document at operation 1112. In some embodiments, the system can provide an indication of why the document was rejected, for example indicating which required values were missing. If, at operation 1110, the document is complete, the system can accept the document at operation 1114. At operation 1116, the system can store the document in a data store 1118.

FIG. 12 is a flowchart that illustrates an example process for determining document completeness according to some embodiments. At operation 1202, the system can receive a document. In some embodiments, the document can be associated with a checklist item. At operation 1204, the system can identify a document type associated with the document, for example, as described above with reference to FIG. 11. At operation 1206, the system can extract information from the document, for example, as described herein. At operation 1208, the system can verify document correctness. For example, the system can verify that dates are within an acceptable range (e.g., a closing date is not in the past, a build date for an existing property is not in the future, etc.), that dollar amounts are within a predefined range (e.g., greater than a minimum amount or less than a maximum amount), that values are consistent with values previously entered on other forms, and so forth. At operation 1210, if the system determines that the document is not correct, the system can reject the document at operation 1212. In some embodiments, the system can provide an explanation for why the document was rejected, such as a closing date being in the past, a price being inconsistent with the price on another form, and so forth. If, at operation 1210, the system determines that the document is correct, the system can accept the document at operation 1214. At operation 1216, the system can store the accepted document in a data store 1218. The data store 1218 can be the same data store as the data store 1118.

In some embodiments, the processes shown in FIGS. 11 and 12 can be carried out concurrently or can be combined into a single process that checks both the completeness and correctness of the document. In some embodiments, when a document is accepted, the document can be associated with a checklist item and the checklist item can marked as complete.

FIG. 13 is a diagram that illustrates examples of refining and/or redefining value locations according to some embodiments. The illustrated locations in FIG. 13 can result from, for example, receiving indications of different locations where values can be found and/or from parsing documents to locate information. A document 1300A can have associated therewith a block 1302A where a value is expected to be found. In some embodiments, an OCR algorithm may only process information in the block 1302A in order to extract the corresponding value. In some cases, however, as described herein, the value may not actually be located within the block 1302A. A document 1300B can be similar to the document 1300A, and indeed may be the same as the document 1300A in some cases (e.g., can be a form that uses the same template as the document 1300A). The system can identify a second block 1302B where the value associated with block 1302A can be found. In the document 1300B, blocks 1302A and 1302B overlap, which may indicate that the form has been updated or may simply indicate that the block 1302A was too small to encompass all the areas of the document where the value can be found. Document 1300C shows the block 1302A and another block 1302C where information that was expected to be in block 1302A can be found. In the document 1300C, the location of the block 1302A and the location of the block 1302C do not overlap. This may indicate that the document 1300C is a new version of the document 1300A and that some values have been relocated within the document. In some embodiments, a system can retain both blocks 1302A and 1302C as potential locations for the corresponding value. This can be important, for example, during transition periods when some transactions may use an older form and some may use a newer version of the form. Over time, the older form may appear less and less, and may eventually not appear at all. In some embodiments, a system can be configured to transition so that the block 1302C is the expected location for the value and the block 1302A is no longer associated with the value, and thus is not processed. In this way, the system can dynamically adapt to changing forms, thereby maintaining or improving document processing efficiency.

Various approaches can be used to identify information in documents using OCR. For example, in some cases, an entire document can undergo an OCR process. This can ensure that all information is extracted from the document but can consume significant computing resources and take a significant amount of time. This can be especially problematic as companies increasingly rely on public cloud infrastructure, which often charges based on usage. As described herein, in some cases, only specific portions of a document may be OCRed. For example, if a document has a known arrangement of information, a computer system may only perform OCR on predefined areas where information to be extracted is expected to be located. Scanning only parts of documents can have several advantages, including reduced computer system utilization, faster results, and/or lower costs. By extracting only particular values of interest from a document, the need to parse a larger volume of extracted text to identify the values in the extracted text can be eliminated.

In some cases, more focused OCR (e.g., OCR that extracts only text in specific areas) can fail. For example, areas may be poorly defined or may not cover all areas where values of interest are located, a form may undergo a layout change, and so forth. In some embodiments, a more involved technique such as full-page or full-document OCR can be used when more limited OCR fails. In some embodiments, the results of the more involved technique can be used to update a template, train an OCR model, or otherwise improve the performance of a more limited OCR technique.

FIG. 14 is a flowchart that illustrates an example process for updating a model for a first OCR method according to some embodiments. At operation 1402, a system can receive a document. At operation 1404, the system can extract one or more values from the document using a first OCR method. The first OCR method can be, for example, a method that extracts information only from predefined locations within the document. In some cases, the first OCR method may fail to extract one or more values, for example, because the value is not present in the predefined area or the first OCR method was otherwise unable to successfully extract the value. At operation 1406, if the first OCR method was successful, the system can store the extracted values in a data store 1414. If, at operation 1406, the first OCR method was not successful, the system can, at operation 1408, extract values from the document using a second OCR method. The second OCR method can include, for example, full document or full page OCR, more complex OCR models, etc. At operation 1410, the system can update a model for the first OCR method based on the results of the second OCR method. For example, the second OCR method may determine that a bounding box for a value has moved, may be better able to distinguish between ambiguous characters, and so forth. At operation 1412, the system can store extracted key-value pairs in the data store 1414.

As described herein, different jurisdictions may have different requirements for documents. In some cases, a jurisdiction may require a handwritten ("wet ink") signature on certain documents, while other jurisdictions may permit typed signatures. In some embodiments, the approaches herein can be used to determine if signatures meet one or more signature requirements.

FIG. 15 is a flowchart that illustrates an example signature verification process according to some embodiments. At operation 1502, a system can receive a document. At operation 1504, the system can determine a document type of the document. The document type can be, for example, determined based on a user input, a checklist item associated with the document, metadata of the document, and/or scanning and parsing the contents of the documents. At operation 1506, the system can extract a signature from the document. In some embodiments, extracting the signature can comprise determining that a signature (or, in some cases, any content) is present in a signature area of a document. For example, in some embodiments, the system can check the contents of the signature, while in other embodiments, the system may not check the contents but may instead only check that content exists where a signature is expected to be located. At operation 1508, if the system could not extract a signature, the process can end. In some embodiments, the system can provide an alert indicating that an expected signature was not found. If, at operation 1508, the system was able to identify content in a signature area, the system can, at operation 1510, determine signature requirements for the document. For example, requirements for different documents can be stored in a database, and the system can query the database to determine the requirements based on the document type. At operation 1512, if the identified signature is not compliant with the signature requirements, the process can stop. In some embodiments, the system can provide a notification or otherwise indicate that the signature requirements were not satisfied or that the system was unable to determine if the signature requirements were satisfied. If, at operation 1512, the system determines that the identified signature complies with the signature requirements, the system can, at operation 1514, accept the signature. The process can be repeated for each signature in the document.

In some embodiments, verifying that signature requirements are met can comprise determining that a signature or other content is present in a signature area, determining that a signature is in an acceptable format (e.g., wet ink or typed), etc. In some embodiments, the system can determine if the signature is correct, for example, by extracting the signature and comparing it to an expected value (e.g., to an expected name) or by comparing it to signatures on other documents associated with the same transaction. For example, if handwritten signatures are required, the system may, in some embodiments, compare handwritten signatures across two or more documents to determine if they are similar (e.g., have a similarity within a threshold amount). In some embodiments, the system can generate a vector representation of each extracted signature and can compare signatures using, for example, cosine similarity. Cosine similarity can also be used to, for example, identify matching forms or templates.

In some implementations, the system can use cosine similarity to detect template matches, determine signature similarity, and so forth. Cosine similarity involves measuring the similarity between two vectors in a vector space. In some implementations, templates, signatures, etc., can be represented as vectors (e.g., embeddings). Each dimension of a vector can correspond to a specific feature or characteristic of a template, signature, etc. To determine similarity (e.g., similarity between a received document and a template, or similarity between two signatures), the cosine similarity can be calculated. For example, for a first signature or document represented by a vector $\vec{A}$ and a second signature or template represented by a vector $\vec{B}$, the cosine similarity can be defined as $\vec{A} \cdot \vec{B}/(|\vec{A}||\vec{B}|)$. The cosine similarity can range from −1 to 1, with 1 indicating identical vectors, 0 indicating no similarity (e.g., the vectors are orthogonal), and −1 representing complete dissimilarity. In some implementations, negative values may not be possible, and the cosine similarity can range from 0 to 1.

In some implementations, a system can determine a match if the cosine similarity meets or exceeds a threshold value. Setting the cosine similarity threshold too high or too low can result in false negatives or false positives. For example, if the cosine similarity is set to 1, only exact matches will be found, leading to false negatives as even a slight modification of a template or signature would prevent matching. On the other hand, setting the cosine similarity threshold too low can result in false positives, in which templates or signatures that are unrelated can be identified as matches. In some embodiments, cosine similarity can be used to aid in fraud detection. For example, if two signatures have a cosine similarity of 1, this can indicate that a signature was duplicated from one document to another and may not be a legitimate signature.

In some embodiments, the platform can set similarity thresholds based on risk. For example, a greater similarity may be required for the platform to identify a match for documents that are of high importance or for which an error or omission may compromise or delay a transaction. In some embodiments, users may be able to configure similarity thresholds. For example, in some embodiments, an administrator may be able to set similarity thresholds for an organization.

As described herein, real estate transactions, as well as other complex transactions, often have many forms, laws, regulations, etc., associated therewith. Legal requirements may vary from state to state, county to county, city to city, and so forth. The legal requirements may change over time. For example, there may be new disclosure requirements, new, changed, or eliminated forms, and so forth. Thus, it can be important to keep track of the requirements in different locations. However, doing so can be a daunting task. For example, there are thousands of counties in the United States, each of which may have different legal requirements, required forms, and so forth. In many cases, laws, regulations, forms, etc., are made readily available to the public, for example, on a public-facing website. However, such information is typically not provided in a format that is readily machine-readable or machine-interpretable.

FIG. 16 is a flowchart that illustrates an example process for determining changes to laws, regulations, forms, and so forth, according to some embodiments. For the sake of simplicity and clarity, the following description refers to laws. However, it will be appreciated that the process illustrated in FIG. 16 is not so limited and may be applied in any context where there is a need to determine changes between older and newer data.

At operation 1605, a system can access a first set of authoritative data (e.g., laws). In some embodiments, the system may access the first set of authoritative data via an application programming interface (API), web scraping, etc. While forms, laws, regulations, and so forth are often publicly accessible, in many cases they are not made available in a format that is readily digestible by a computer system. At operation 1610, the system can store the first authoritative data. At a later time, the system can access second authoritative data at operation 1615. In some embodiments, the second authoritative data can be an updated version of the first authoritative data. For example, the second authoritative data can include updated laws, updated forms, etc. At operation 1620, the system can determine a mapping between the first and second authoritative data. For example, the system can determine a mapping between different provisions of a previous law and an updated law, or can determine a mapping between older forms and newer versions of the same forms. At operation 1625, the system can provide the mapped authoritative data and a prompt to an LLM. The prompt can instruct the LLM to compare the first and second authoritative data and determine any changes between the first and second authoritative data. At operation 1630, the system can determine differences between the first and second authoritative data, for example, as determined by the LLM or based on results provided by the LLM. In some embodiments, a system can be configured to automatically update a checklist based on the differences. However, LLMs can be prone to errors. At operation 1635, the system can determine if a confidence in the differences determined by an LLM is above a confidence threshold. For example, simple changes may be above the confidence threshold, while more complex changes may be below the confidence threshold. As an example, if a list of required disclosures is updated to include an additional disclosure, there may be high confidence in the changes determined by the LLM. However, if a change is more complex, such as altering details of escrow requirements, the confidence can be below the confidence threshold. If, at operation, the confidence threshold is satisfied, the system can update a checklist to reflect the requirements of the second authoritative data. If, at operation 1635, the confidence threshold is not satisfied, the system can route the changes to a human for review at operation 1640. In some embodiments, the system can provide the first authoritative data, the second authoritative data, and the determined differences to a human reviewer, and the human reviewer can determine whether the differences determined by the LLM are correct or not. If the differences determined by the LLM are correct, the system can update one or more checklists at operation 1645. If, however, the LLM was incorrect, the reviewer can provide a correction, which can be used to update one or more checklists at operation 1645. In some embodiments, any corrections provided by the reviewer can be used to update the LLM, to improve prompts provided to the LLM, etc., which can improve the reliability of the LLM over time.

In some embodiments, a document type can be indicated by a user or can be determined based on a checklist item associated with the document. However, in some cases, the document type may not be readily available, but can instead be determined by analyzing the document. In some embodiments, the document type can be determined by extracting text from the document and comparing the extracted text to text for known documents (e.g., known templates) stored in a document library. In some embodiments, a document type can be determined based on an extracted document title, form identifier, revision identifier, etc. In some embodiments, a system can be configured to compute a similarity score in order to identify a matching document or template.

FIG. 17 is a flowchart that illustrates a process for identifying a document type according to some embodiments. At operation 1705, a system can receive a document. At operation 1710, the system can encode a vector representation (e.g., embedding) of the document. At operation 1715, the system can compute a similarity score between the vector representation of the document and a vector representation of a template in a document library. This process can be repeated for a plurality of vector representations of templates in the document library. In some embodiments, the similarity score can be, for example, cosine similarity, Euclidean distance, Manhattan distance, etc. At operation 1720, the system can identify a candidate matching template. At operation 1725, if the similarity is above a first threshold, the system can determine that the document matches the candidate template and can process the document (e.g., extract key-value pairs) from the document at operation 1730. If the similarity is below the first threshold, the system can, at operation 1735, determine if the similarity is above a second threshold. The second threshold can be lower than the first threshold. If not, the process can stop. If so, the system can provide the matching template to the user at operation 1740. A user can review the candidate template and accept or reject the candidate template. If the user accepts the candidate template, the system can process the document at operation 1730. If not, the system can receive a user selection of a template at operation 1750. For example, the system can provide a list of templates which, in some embodiments, can be ordered according to similarity score, and the user can select which, if any, template corresponds to the document. At operation 1755, if the user identified a matching template, the system can process the document using the selected template at operation 1730. If the user did not select a template, the process can stop.

Compliance Review Processes and Dynamic Compliance Requirement Determination

Ensuring compliance can be a daunting task, and it can be economically infeasible to engage in human review of all documents related to a real estate listing or transaction. Moreover, human reviewers can be prone to errors, especially when confronted with large volumes of documents where errors may be hard to find and/or easy to overlook. However, the presence of errors in documents can compromise a listing or transaction, result in legal risk, and so forth. Thus, it is important to identify errors in documents relating to real estate listings and transactions.

In some embodiments, the approaches described herein can reduce human involvement in compliance processes while improving the overall effectiveness of compliance reviews. Compliance reviews can include, for example, validating an uploaded document, validating that a correct document was uploaded, automated review of system-generated or system-provided documents, automated review of external documents, complete human review of system-generated or system-provided documents, and/or complete human review of external documents.

As described herein, required documents can be extensive and can vary from jurisdiction to jurisdiction and even from property to property. For example, different documents may be required for an older house than a newer house, for a condominium versus a single family detached home, etc. In some embodiments, a system can be configured to determine required documents based on information (e.g., key-value pairs) extracted from uploaded documents or information. For example, if a new listing indicates that a property is located in California and was built in 1924, the system can determine that a lead-based paint disclosure and an asbestos disclosure are required, and the system can automatically add the lead-based paint disclosure and the asbestos disclosure to a checklist associated with the property. In some embodiments, the system can automatically add requirements and enforce the requirements as documents or other information are added to a transaction or listing. In some embodiments, compliance requirements can be removed or marked as optional based on information that is received by the system.

In some embodiments, the approaches herein can include automated system review. In some embodiments, the automated system review can review documents in real-time or nearly real-time and approve or reject documents. In some embodiments, the system can provide a message or other indication that a document was accepted or rejected. In some embodiments, a document can be automatically accepted. In some embodiments, a document may be routed to a human for exception review. In some embodiments, the system can route a document for exception review when the system detects an error or inconsistency or when the system determines a value in a document with below a threshold confidence value. For example, if the system performs OCR on a submitted document and has a confidence in an extracted value below a threshold amount, the system can route the document for exception review. In some embodiments, the system can provide a reason for the exception review. As an example, if the system was unable to determine an address with at least a threshold confidence level, the system can indicate that the address data in a document needs to be reviewed. As another example, the system can attempt to confirm a signature, but may be unable to do so because, for example, the signature is inconsistent with an expected value (e.g., because the person who signed the document included a middle initial where one was not expected). As another example, a system may be unable to verify a wet ink signature due to differences in writing styles (e.g., print vs. cursive, neat vs. sloppy, etc.).

In some embodiments, reviews can be automated, for example, by checking for content in required fields, validating values, etc. For example, in some embodiments, a system can be configured to extract a property value and determine if the property value is a numerical value and is within a predefined range of values. In some embodiments, the system can perform address validation. For example, the system can extract a street address, city, state, zip code, etc., and can check the extracted address information against an authoritative source, such as postal service data, property records data, and so forth. In some embodiments, property records can be used as a primary source of address verification. In some cases, postal data can be used as a primary source of address verification. In some embodiments. postal data can be used as a primary source and property records can be used as a secondary source. For example, not all properties may have a well-defined postal address, for example in rural areas without home mail delivery services.

In some embodiments, some documents can be routed for manual review. For example, as described herein, in some embodiments, documents can be routed for manual review when an automatic system review fails or achieves an indeterminate result (e.g., confidence below a threshold amount). In some embodiments, certain documents can be automatically routed for human review without regard to the results of an automatic system review and, in some cases, without the occurrence of an automatic system review. For example, if there is a simple exception (e.g., confirming an address or verifying a signature), a system can route a document for human review after performing automatic system review. In some embodiments, the human reviewer can modify extracted values or accept extracted values. Human review without automatic system review or regardless of the automatic system review can be indicated when, for example, a document contains an unusual addendum, free text, etc., in which case a human may review the document and determine any actions to be taken based on the contents of the document.

Automated review can have many benefits. For example, automated review can save substantial time and expense, reduce errors, and so forth. However, automated systems can be prone to errors. For example, when an LLM is used for summarizing freeform text, the LLM may inaccurately summarize the text, omit important information, and so forth. OCR methods may make errors when extracting values, for example mixing up the letter "O" and the number "0," the letter "I" and the number "1," and so forth. In some cases, such issues may be especially pronounced when a document is handwritten or written in a font that lacks consistent spacing, well-defined, and differentiated letterforms, etc. Accordingly, it can be important to conduct reviews of automated review processes to ensure that the results are reliable and correct.

In some embodiments, a random selection of transactions can be selected for human review. In some embodiments, a random selection can be made for each market of a plurality of markets. This can be significant because, as described herein, different markets may have different forms, different requirements, and so forth. In some embodiments, random selection can be performed on a scheduled basis, for example, daily, weekly, monthly, quarterly, etc. In some embodiments, selection can be performed on an ad hoc basis, for example, based on a user request for a sample of transactions to review. A human reviewer, such as a managing broker, can review the transactions and make any needed adjustments. The adjustments can be used to update one or more models to improve performance of the models.

While random sampling is described above, in some embodiments, samples may not be truly random. For example, in some embodiments, sampling can be based at least in part on past performance. For example, if certain types of transactions, certain types of properties, etc., tend to have more issues with automated review, those transactions or properties can be given a greater weight (i.e., a greater likelihood of being selected) when selecting a sample of transactions for human review. This can result in improved detection of issues in transactions. However, it may still be desirable to include some other transactions in a sample. For example, if transactions with relatively low error rates are excluded from sampling, an issue could emerge that causes the performance of automatic review systems to decline on such transactions, which could go undetected. For example, when tuning a model to improve performance on transactions that are more likely to have issues, such tuning may negatively impact performance on other types of transactions that have historically shown relatively low error rates.

In some cases, there may be a need to provide data for an external audit. For example, a state agency, auditing firm, law firm, etc., may need or want to conduct a review of transactions. In some embodiments, a system can be configured to make all transactions, documents, automated checks, auditor checks, etc., available for external review by an auditor. In some embodiments, the system can be configured to provide access to data from a certain time period, for example as specified by a user. In some embodiments, the system can generate a read-only copy of the data. In some embodiments, the system can provide read-only access to data on the platform. In some embodiments, the platform can make the data available via download, via a user interface (e.g., an application or website), etc.

Machine Learning

Machine learning models can used for various operations as described herein. A model can refer to a construct that is trained using training data to generate new data items, classify data items, or analyze data items, for example, to make predictions or provide probabilities. For example, training data for supervised learning can include items with various parameters and an assigned classification. A new data item can have parameters that a model can use to assign a classification to the new data item. As another example, a model can be configured to output a probability based on analysis of training data. Examples of models include, for example, neural networks, support vector machines, decision trees, random forests, Parzen windows, Bayes, clustering (e.g., k-means clustering), reinforcement learning, probability distributions, and others. Models can be configured for various use cases, data types, sources, and output formats.

In some implementations, a model can be a neural network with multiple input nodes that receive input data. The input nodes can correspond to functions that receive the input and produce results. These results can be provided to one or more levels or intermediate nodes that each produce further results based on a combination of lower-level node results. A weighting factor can be applied to the output of each node before the result is passed to the next layer of nodes. At a final layer ("output layer"), one or more output nodes can produce a value that, once the model is trained, can be used for classification, prediction, and so forth. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A machine learning model can, in some implementations, be trained using supervised learning, in which training data includes one or more inputs and a label or tag indicating the desired output. A representation of the input data can be provided to the model, for example after applying one or more transformations, such as one-hot encoding. Output from the model can be compared to the desired output for that input and, based on the comparison, the model can be modified, such as by changing weights between nodes of the neural network or parameters of the functions (e.g., activation functions) used at each node in the neural network. In some implementations, weights can be adjusted based on the results of a loss function.

Some implementations herein can make use of retrieval augmented generation (RAG). RAG is a technique used in natural language processing and other machine learning tasks to enhance the quality and relevance of the outputs of a model (e.g., a summary, an explanation, etc.). In RAG, a retrieval model is first used to retrieve relevant information or context from a large corpus of text. This retrieved information can be used as an input to another model, for example, a generative large language model. The output of this model can be based at least in part on the retrieved contextual information. By incorporating a retrieval step, a generative model can provide more accurate and contextually appropriate outputs.

RAG can be particularly useful in tasks such as answering questions, summarizing text, and engaging in dialogs, where contextual information can be critical. RAG can help overcome some limitations of pure generative models, which can be susceptible to generating irrelevant or nonsensical responses (colloquially referred to as hallucinations).

As an example, language used in real estate transactions can have specific meanings within the context of real estate. For example, a term such as "zone" can have various meanings, but in the context of real estate, generally refers to the types of uses for which a piece of land can be used. As another example, the term "title" can refer to a title bestowed on an individual, a name or heading of a document or movie, etc. However, in the context of real estate transactions, title has a specific meaning as a legal instrument. These are merely examples. It will be appreciated that there can be many terms that have specific meanings in the context of real estate transactions. RAG is not limited to merely addressing differences in the meaning of terms. RAG can provide broader contextual information, providing important cues, background information, references, and so forth.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles, and the novel features disclosed herein.

What is claimed is:

1. A computer-implemented method for document ingestion comprising:
  receiving, by a computing system, a document associated with a checklist item of a checklist;
  determining, by the computing system, a document type of the document;
  identifying, by the computing system, a template associated with the document based at least in part on the document type;
  identifying, by the computing system, an area of the document associated with a value of a key-value pair based at least in part on the template;
  extracting, by the computing system, using a first optical character recognition process, the value from the area, wherein the first optical character recognition process is configured to extract the value from the area associated with the value;
  causing, by the computing system, display, to a user, of the value;
  receiving, by the computing system, a corrected value from the user;
  extracting, by the computing system, using a second optical character recognition process, full text of the document;
  determining, by the computing system, based at least in part on the full text of the document, a location of the corrected value in the document; and
  updating, by the computing system, based on the location, the first optical character recognition process, wherein updating the first optical character recognition process causes the first optical character recognition process to extract the value from the location.

2. The computer-implemented method of claim 1, further comprising:

identifying, by the computing system, a signature block in the document;
  identifying, by the computing system, a signature in the signature block;
  determining, by the computing system, a compliance rule associated with the signature block;
  applying, by the computing system, the compliance rule to the signature in the signature block; and
  determining, by the computing system based on applying the compliance rule, that the signature in the signature block complies with the compliance rule.

3. The computer-implemented method of claim 2, wherein determining that the signature complies with the compliance rule comprises:
  generating, by the computing system, a vector representation of the signature;
  computing, by the computing system, a cosine similarity of the vector representation of the signature and a vector representation of another signature associated with a same signer; and
  determining, by the computing system, that the cosine similarity is above a threshold value,
  wherein the cosine similarity comprises a value from zero to one.

4. The computer-implemented method of claim 3, further comprising:
  receiving, by the computing system, a rejection indication;
  identifying, by the computing system, a rejection reason; and
  updating, by the computing system, the checklist item, wherein updating the checklist item comprises providing an indication that the document was rejected.

5. The computer-implemented method of claim 1, wherein determining the document type comprises:
  generating, by the computing system, a vector representation of the document;
  accessing, by the computing system, a plurality of template vector representations;
  computing, by the computing system, at least one cosine similarity of the vector representation of the document and at least one of the plurality of template vector representations, wherein comparing comprising computing a cosine similarity; and
  determining, by the computing system based on the cosine similarity, a matching template, wherein the matching template is associated with the document type.

6. The computer-implemented method of claim 1, further comprising:
  receiving, by the computing system, an indication from the user that the document is ready for review;
  storing, by the computing system, the document in a data store;
  storing, by the computing system, the value of the key-value pair in the data store, wherein the value is associated with the document; and
  providing, by the computing system, an auditor notification, wherein the auditor notification indicates that the document is ready for review.

7. The computer-implemented method of claim 1, further comprising:
  determining, by the computing system based at least in part on the document type, a compliance rule associated with the document;
  applying, by the computing system, the compliance rule, wherein the applying the compliance rule comprises checking for at least one of: correctness of the document or completeness of the document;

determining, by the computing system based at least in part on applying the compliance rule, that the document complies with the compliance rule; and accepting, by the computing system, the document, wherein accepting the document comprises updated the checklist item to indicate that the checklist item is complete.

8. The computer-implemented method of claim 1, further comprising:

determining, by the computing system based at least in part on the document type, a risk level associated with the document;

determining, by the computing system based at least in part on the risk level, a review level for the document; and routing, by the computing system, the document for review based on the review level, wherein routing the document for review comprises at least one of: automatically accepting the document, conducting an automatic system review of the document, or routing the document for manual review.

9. The computer-implemented method of claim 8, wherein routing the document for review comprises automatically accepting the document when the risk level indicates that the document is an inherently low risk document.

10. The computer-implemented method of claim 1, further comprising:

determining, by the computing system based at least in part on the value, an update to the checklist;

updating, by the computing system, the checklist based on the determined update, wherein updating the checklist comprises one or more of: adding a checklist item, removing a checklist item, changing a checklist item from optional to required, or changing a checklist item from required to optional.

11. A system comprising:

at least one processor; and a non-volatile storage medium having instructions thereon that, when executed by the at least one processor, cause the system to:

receive a document associated with a checklist item of a checklist;

determining a document type of the document;

identify a template associated with the document based at least in part on the document type;

identify an area of the document associated with a value of a key-value pair based at least in part on the template;

extract, using a first optical character recognition process, the value from the area, wherein the first optical character recognition process is configured to extract the value from the area associated with the value;

case display, to a user, of the value;

receive a corrected value from the user;

extract, using a second optical character recognition process, full text of the document;

determine, based at least in part on the full text of the document, a location of the corrected value in the document; and update, based on the location, the first optical character recognition process,

40 wherein updating the first optical character recognition process causes the first optical character recognition process to extract the value from the location.

12. The system of claim 11, wherein the instructions are further configured to cause the system to:

identify a signature block in the document;

identify a signature in the signature block;

determine a compliance rule associated with the signature block;

apply the compliance rule to the signature in the signature block; and determine, based on applying the compliance rule, that the signature in the signature block complies with the compliance rule.

13. The system of claim 12, wherein determining that the signature complies with the compliance rule comprises:

generating a vector representation of the signature;

computing a cosine similarity of the vector representation of the signature and a vector representation of another signature associated with a same signer; and determining that the cosine similarity is above a threshold value, wherein the cosine similarity comprises a value from zero to one.

14. The system of claim 13, wherein the instructions are further configured to cause the system to:

receive a rejection indication;

identify a rejection reason; and update the checklist item, wherein updating the checklist item comprises providing an indication that the document was rejected.

15. The system of claim 11, wherein determining the document type comprises:

generating a vector representation of the document;

accessing a plurality of template vector representations;

computing at least one cosine similarity of the vector representation of the document and at least one of the plurality of template vector representations, wherein comparing comprising computing a cosine similarity; and determining, based on the cosine similarity, a matching template, wherein the matching template is associated with the document type.

16. The system of claim 11, wherein the instructions further configured to cause the system to:

receive an indication from the user that the document is ready for review;

store the document in a data store;

store the value of the key-value pair in the data store, wherein the value is associated with the document; and provide an auditor notification, wherein the auditor notification indicates that the document is ready for review.

17. The system of claim 11, wherein the instructions are further configured to cause the system to:

determine, based at least in part on the document type, a compliance rule associated with the document;

apply the compliance rule, wherein applying the compliance rule comprises checking for at least one of: correctness of the document or completeness of the document;

determine, based at least in part on applying the compliance rule, that the document complies with the compliance rule; and accept the document, wherein accepting the document comprises updated the checklist item to indicate that the checklist item is complete.

18. The system of claim 11, wherein the instructions are further configured to cause the system to:

determine, based at least in part on the document type, a risk level associated with the document;

determine, based at least in part on the risk level, a review level for the document; and route the document for review based on the review level, wherein routing the document for review comprises at least one of: automatically accepting the document, conducting an automatic system review of the document, or routing the document for manual review.

19. The system of claim 18, wherein routing the document for review comprises automatically accepting the document when the risk level indicates that the document is an inherently low risk document.

20. The system of claim 11, wherein the instructions are further configured to cause the system to:

determine, based at least in part on the value, an update to the checklist;

update the checklist based on the determined update, wherein updating the checklist comprises one or more of: adding a checklist item, removing a checklist item, changing a checklist item from optional to required, or changing a checklist item from required to optional.

\* \* \* \* \*